US 12,436,581 B2

(12) United States Patent
Yin et al.

(10) Patent No.: US 12,436,581 B2
(45) Date of Patent: Oct. 7, 2025

(54) QUICK RELEASE MECHANISM AND ELECTRONIC ASSEMBLY

(71) Applicant: Wiwynn Corporation, New Taipei (TW)

(72) Inventors: Jui Lien Yin, New Taipei (TW); Chih Hui Hsieh, New Taipei (TW); Kun Hsien Lee, New Taipei (TW)

(73) Assignee: WIWYNN CORPORATION, New Taipei (TW)

( * ) Notice: Subject to any disclaimer, the term of this patent is extended or adjusted under 35 U.S.C. 154(b) by 214 days.

(21) Appl. No.: 18/335,233

(22) Filed: Jun. 15, 2023

(65) Prior Publication Data

US 2024/0302877 A1    Sep. 12, 2024

(30) Foreign Application Priority Data

Mar. 10, 2023    (TW) ................................ 112108823

(51) Int. Cl.
  *G06F 1/18*    (2006.01)
(52) U.S. Cl.
  CPC .................................... *G06F 1/187* (2013.01)
(58) Field of Classification Search
  CPC .............................. G06F 1/187; F16B 2200/83
  See application file for complete search history.

(56) References Cited

U.S. PATENT DOCUMENTS 10,074,403 B2 *    9/2018    Chen .................... G11B 33/022
2014/0096467 A1 *    4/2014    Norton ................ E04F 13/0833
                                                                        52/582.2

FOREIGN PATENT DOCUMENTS

| CN | 210745805 U | 6/2020 |
| TW | I463077 B | 12/2014 |
| TW | M498233 U | 4/2015 |
| TW | I709362 B | 11/2020 |

OTHER PUBLICATIONS

TW Office Action dated Oct. 20, 2023 in Taiwan application No. 112108823.

* cited by examiner

Primary Examiner — James Wu
(74) Attorney, Agent, or Firm — McClure, Qualey & Rodack, LLP

(57) ABSTRACT

A quick release mechanism includes a fixed component, at least one engagement component and a disengagement component. The fixed component has at least one slide channel and at least one first opening, and the at least one first opening communicates with one side of the at least one slide channel. The at least one engagement component includes a slidable portion and an engagement portion. The slidable portion is slidably located in the at least one slide channel, and the engagement portion is connected to the slidable portion and configured to penetrate through the at least one first opening. The disengagement component is removably disposed on the fixed component so as to move the engagement portion of the at least one engagement component to be located closer to or farther away from another side of the at least one slide channel.

20 Claims, 23 Drawing Sheets

QUICK RELEASE MECHANISM AND ELECTRONIC ASSEMBLY

CROSS-REFERENCE TO RELATED APPLICATIONS

This non-provisional application claims priority under 35 U.S.C. § 119(a) on Patent Application No(s). 112108823 filed in Taiwan, R.O.C. on Mar. 10, 2023, the entire contents of which are hereby incorporated by reference.

TECHNICAL FIELD

The disclosure relates to a quick release mechanism and an electronic assembly, more particularly to a quick release mechanism and an electronic assembly which have anti-theft function.

BACKGROUND

In general, there are various electronic assemblies in the server, such as hard disk drive assemblies and expansion card assemblies. Most of these electronic assemblies are fixed in the casing via quick release mechanisms, which enable the assemblies to be repaired and maintained easily.

However, anyone can operate the quick release mechanisms to remove the electronic assemblies, and such quick release mechanisms cannot prevent someone from accidentally removing the electronic assemblies, or even prevent someone from stealing the electronic assemblies. Therefore, how to solve the aforementioned issue is one of the crucial topics in this field.

SUMMARY

One embodiment of the disclosure provides a quick release mechanism. The quick release mechanism includes a fixed component, at least one engagement component and a disengagement component. The fixed component has at least one slide channel and at least one first opening, and the at least one first opening communicates with one side of the at least one slide channel. The at least one engagement component includes a slidable portion and an engagement portion. The slidable portion is slidably located in the at least one slide channel, and the engagement portion is connected to the slidable portion and configured to penetrate through the at least one first opening. The disengagement component is removably disposed on the fixed component so as to move the engagement portion of the at least one engagement component to be located closer to or farther away from another side of the at least one slide channel.

Another embodiment of the disclosure provides an electronic assembly. The electronic assembly is adapted to be disposed on a casing. The electronic assembly includes a tray, an electronic device and a quick release mechanism. The tray is adapted to be disposed on the casing. The electronic device is fixed to the tray. The quick release mechanism includes a fixed component and at least one engagement component. The fixed component is fixed to the tray and has at least one slide channel and at least one first opening. The at least one first opening communicates with one side of the at least one slide channel. The at least one engagement component includes a slidable portion and an engagement portion. The slidable portion is slidably located in the at least one slide channel, and the engagement portion is connected to the slidable portion and is configured to be inserted into or removed from a positioning hole of the casing.

Still another embodiment of the disclosure provides a quick release mechanism. The quick release mechanism includes a fixed component and at least one engagement component. The fixed component has at least one slide channel and at least one first opening. The at least one first opening communicates with one side of the at least one slide channel. The at least one engagement component includes a slidable portion, an engagement portion, a lateral engagement portion and a movable portion. The slidable portion is slidably located in the at least one slide channel, the engagement portion is connected to the slidable portion and configured to be penetrate through the at least one first opening. The at least one engagement component has an interior channel, the interior channel extends from the slidable portion to the engagement portion. The engagement portion has at least one opening, the at least one opening communicates with the interior channel along a radial direction of the engagement portion. At least a part of the lateral engagement portion is located in the interior channel and corresponds to the at least one opening. The movable portion is movably located in the interior channel so as to move the lateral engagement portion to stick out of or retract into the interior channel from the at least one opening.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
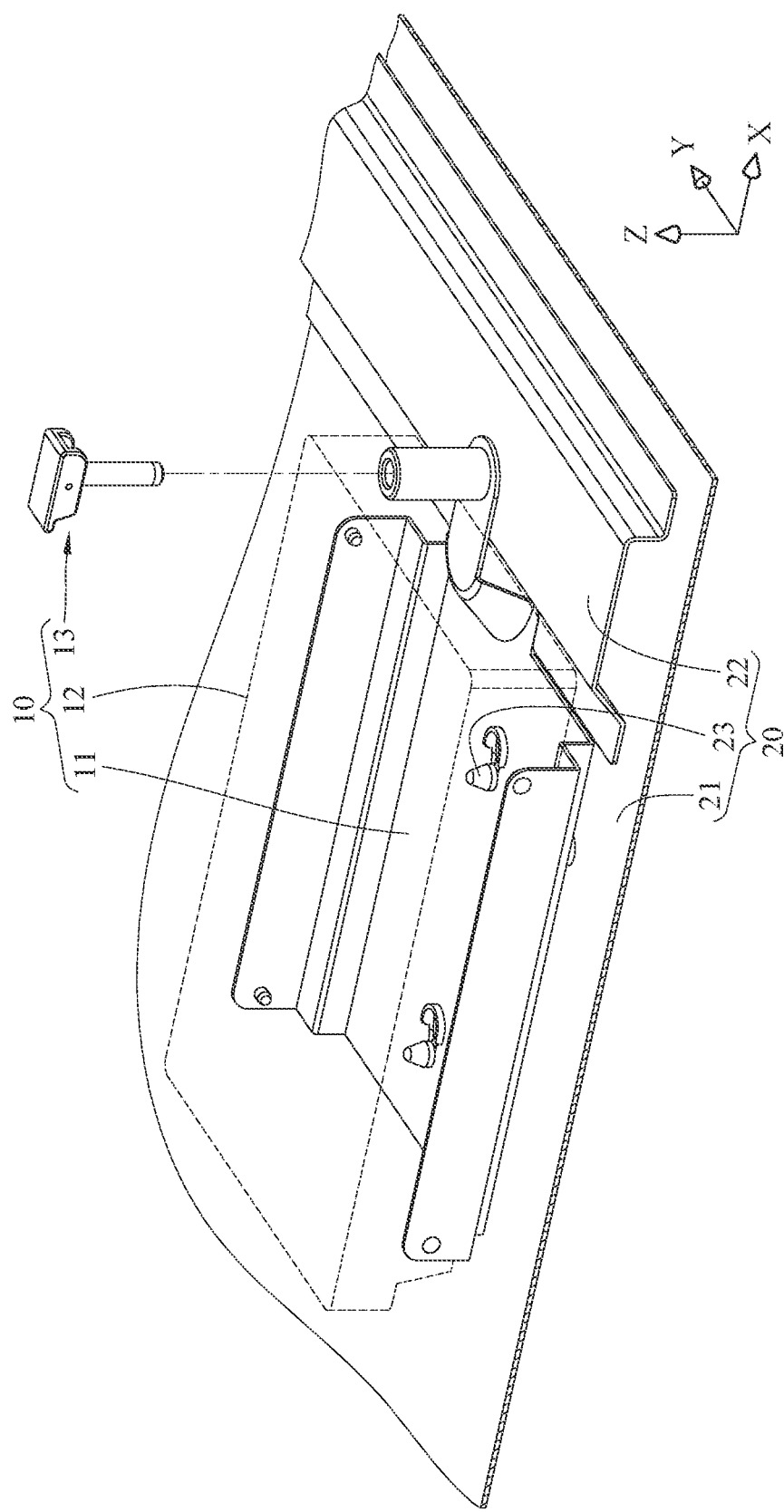
FIG. 1 is a partial perspective view of an electronic assembly and a casing according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
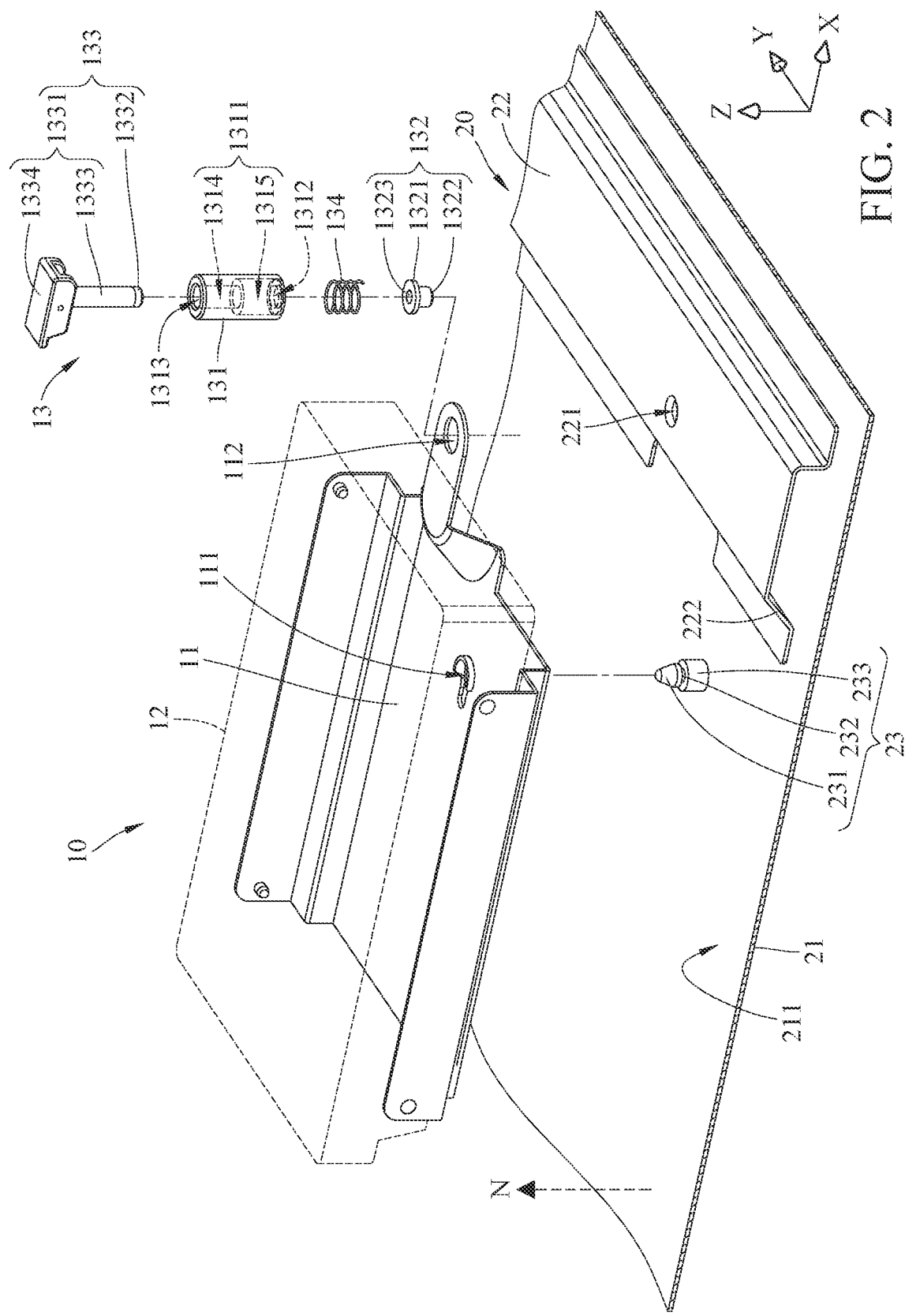
FIG. 2 is an exploded view of the electronic assembly and the casing in FIG. 1.
Figure 3:
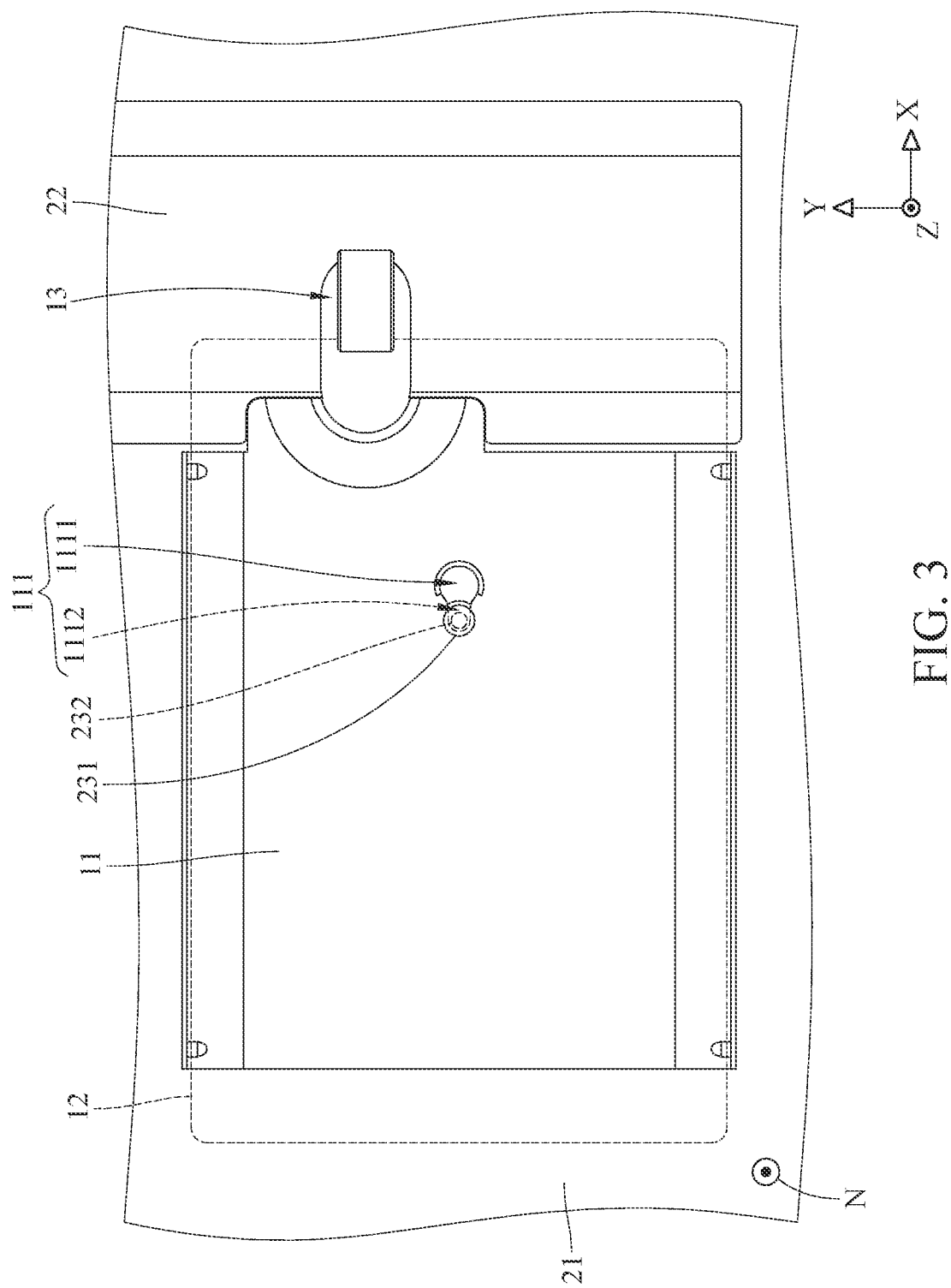
FIG. 3 is a top view of the electronic assembly and the casing in FIG. 1.

Referring to FIGS. 1 to 3, FIG. 1 is a partial perspective view of an electronic assembly 10 and a casing 20 according to a first embodiment of the disclosure, FIG. 2 is an exploded view of the electronic assembly 10 and the casing 20 in FIG. 1, and FIG. 3 is a top view of the electronic assembly 10 and the casing 20 in FIG. 1.

In this embodiment, the electronic assembly 10 is, but not limited to, a hard disk drive assembly. The electronic assembly 10 is configured to be removably fixed to the casing 20. The casing 20 is, for example, a server casing. The casing 20 includes a support plate 21, a positioning plate 22 and a positioning pillar 23. The positioning plate 22 is fixed on a surface 211 of the support plate 21, and the positioning plate 22 has a positioning hole 221. The positioning pillar 23 includes a head portion 231, a neck portion 232 and a body portion 233. The neck portion 232 is located between and connected to the head portion 231 and the body portion 233, and a width of the neck portion 232 is smaller than a width of the head portion 231 and a width of the body portion 233. The body portion 233 of the positioning pillar 23 is fixed on the surface 211 of the support plate 21. In a three-dimensional coordinate system, a Z-axis direction is defined as a vertical direction and is parallel to a normal line N of the surface 211 of the support plate 21, and an X-axis direction and a Y-axis direction are defined as horizontal directions and are perpendicular to the normal line N of the surface 211 of the support plate 21.

The electronic assembly 10 includes a tray 11, an electronic device 12 and a quick release mechanism 13.

The tray 11 has a positioning hole 111 and a mount hole 112. The positioning hole 111 is, for example, a pear-shaped hole. The positioning hole 111 has a wide portion 1111 and a narrow portion 1112 communicating with each other. A width of the wide portion 1111 is larger than a width of the narrow portion 1112. The neck portion 232 of the positioning pillar 23 of the casing 20 is configured to be located at the narrow portion 1112 of the positioning hole 111 of the tray 11, and a part of the tray 11 is configured to be located between the head portion 2321 and the body portion 233 of the positioning pillar 23, such that the tray 11 is unable to be moved upwards relative to support plate 21 along the Z-axis direction. The electronic device 12 is, for example, a hard disk drive. The electronic device 12 is fixed on the tray 11.

Figure 4:
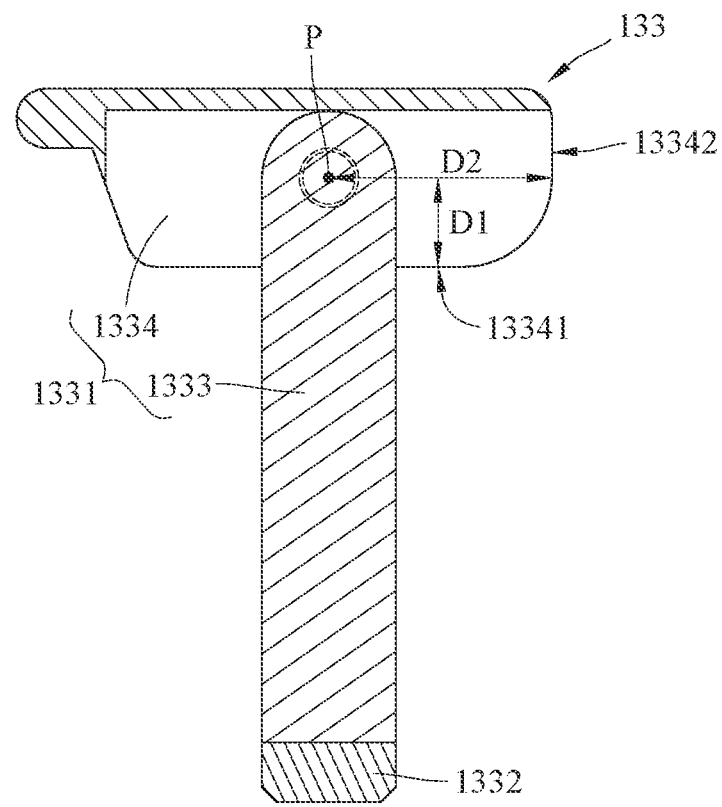
FIG. 4 is a partial cross-sectional view of the electronic assembly and the casing in FIG. 1.
Figure 4:
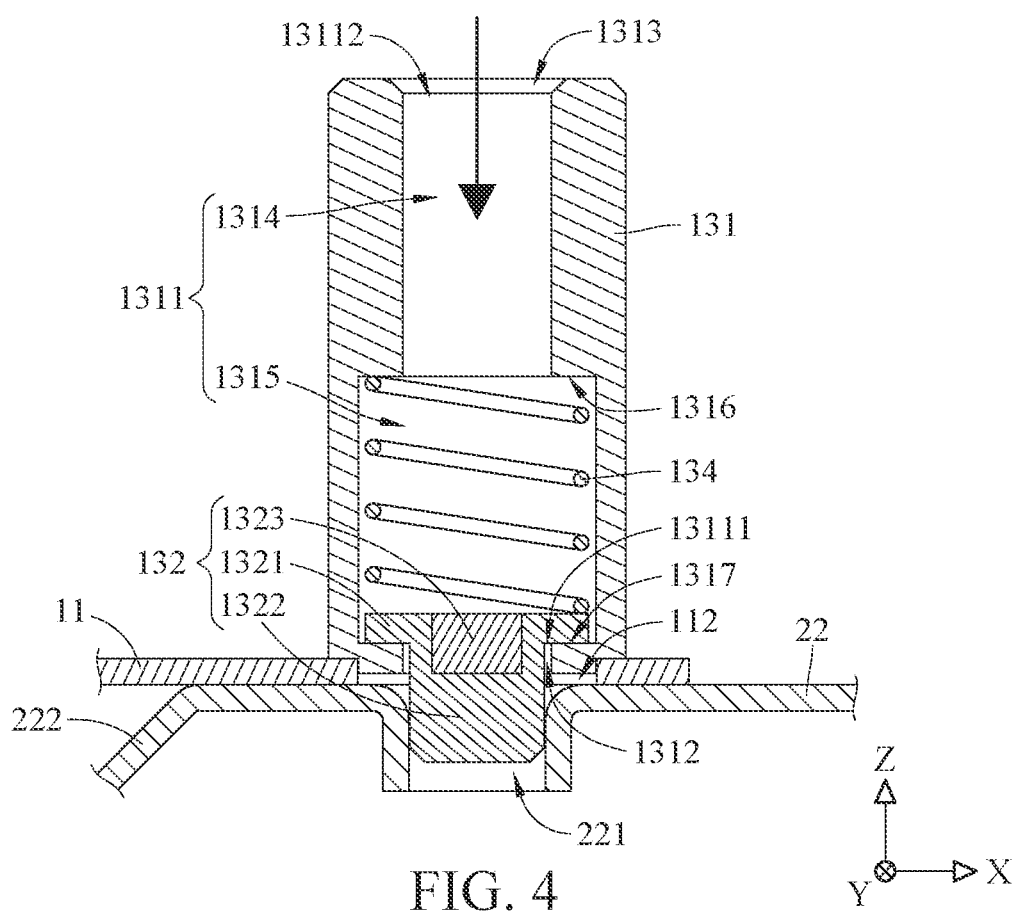

Then, referring to FIGS. 2 and 4, FIG. 4 is a partial cross-sectional view of the electronic assembly 10 and the casing 20 in FIG. 1. The quick release mechanism 13 includes a fixed component 131, an engagement component 132 and a disengagement component 133. In addition, the quick release mechanism 13 may further include an elastic component 134.

The fixed component 131 is fixed into the mount hole 112 of the tray 11. The fixed component 131 has a slide channel 1311, a first opening 1312 and a second opening 1313. The slide channel 1311 has a narrow portion 1314 and a wide portion 1315 communicating with each other. An inner diameter of the wide portion 1315 is larger than an inner diameter of the narrow portion 1314, and a first contact surface 1316 is formed at a place where the wide portion 1315 communicates with the narrow portion 1314. The first opening 1312 communicates with one side of the wide portion 1315 located farther away from the narrow portion 1314; that is, the first opening 1312 communicates with one side 13111 of the slide channel 1311. An inner diameter of the first opening 1312 is smaller than the inner diameter of the wide portion 1315, and a second contact surface 1317 is formed at a place where the first opening 1312 communicates with the wide portion 1315. The second opening 1313 is, for example, a round opening, and the second opening 1313 communicates with one side of the narrow portion 1314 of the slide channel 1311 located farther away from the wide portion 1315; that is, the second opening 1313 communicates with another side 13112 of the slide channel 1311.

The engagement component 132 includes a slidable portion 1321, an engagement portion 1322 and a first magnetic portion 1323. The engagement portion 1322 is connected to the slidable portion 1321, and an outer diameter of the engagement portion 1322 is smaller than an outer diameter of the slidable portion 1321. The slidable portion 1321 is slidably hidden in the wide portion 1315 of the slide channel 1311 of the fixed component 131. The engagement portion 1322 sticks out of the slide channel 1311 from the first opening 1312 of the fixed component 131. The engagement portion 1322 is configured to be inserted into the positioning hole 221 of the positioning plate 22 of the casing 20, such that the tray 11 is unable to be horizontally moved relative to the support plate 21 along the X-axis direction and the Y-axis direction. The first magnetic portion 1323 is, for example, a temporary magnet, and the first magnetic portion 1323 is disposed on the slidable portion 1321.

The elastic component 134 constantly provides a force to prevent the engagement component 132 from being detached from the positioning hole 221 due to vibration or incorrect direction of placement. In some embodiments, the elastic component 134 is, for example, a compression spring. The elastic component 134 is located in the slide channel 1311 of the fixed component 131, and two opposite ends of the elastic component 134 are respectively connected to the fixed component 131 and the slidable portion 1321 of the engagement component 132. For example, the elastic component 134 is located in the wide portion 1315 of the slide channel 1311 of the fixed component 131, and two opposite ends of the elastic component 134 are respectively in contact with the first contact surface 1316 and the slidable portion 1321 of the engagement component 132. The elastic component 134 is configured to move the slidable portion 1321 so as to move the engagement portion 1322 to stick out of the slide channel 1311 from the first opening 1312 of the fixed component 131. In other words, when there is no other force applied on the engagement portion 1322, the elastic component 134 constantly forces the engagement portion 1322 to stick out of the slide channel 1311 from the first opening 1312 of the fixed component 131, such that the engagement portion 1322 is maintained to be inserted into the positioning hole 221 of the positioning plate 22 of the casing 20, and the slidable portion 1321 of the engagement component 132 is in contact with the second contact surface 1317. Note that, in some other embodiments (not shown in figures), one end of the elastic component may be connected to (e.g., fixed to) an inner surface of the fixed component, while another end of the elastic component may be in contact with the slidable portion of the engagement component. In such a configuration, the first contact surface 1316 and the wide portion 1315 can be omitted, and the elastic component may also constantly provide the force to the engagement component 132.

Note that the elastic component 134 is not restricted to being the compression spring. In some other embodiments, the elastic component may be an extension spring, and two opposite ends of the extension spring are respectively fixed to the second contact surface and the slidable portion of the engagement component. In addition, the elastic component 134 may be an optional component. In some other embodiments, the quick release mechanism may not have the elastic component, and the engagement portion may be maintained to stick out of the slide channel from the first opening of the fixed component and to be inserted into the positioning hole of the positioning plate of the casing via gravity.

The disengagement component 133 includes a main portion 1331 and a second magnetic portion 1332. The main portion 1331 includes an insertion body 1333 and a handle 1334. The insertion body 1333 is, for example, a cylindrical pillar. The handle 1334 is pivotally disposed on one end of the insertion body 1333. The handle 1334 has a first contact surface 13341 and a second contact surface 13342 located adjacent to each other. A distance D1 from the first contact surface 13341 to a rotation axis P of the handle 1334 is smaller than a distance D2 from the second contact surface 13342 to the rotation axis P of the handle 1334. The second magnetic portion 1332 is, for example, a permanent magnet, and the second magnetic portion 1332 is disposed on another end of the insertion body 1333 located farther away from the handle 1334.

In this embodiment, the insertion body 1333 is removably inserted into the slide channel 1311 from the second opening 1313 of the fixed component 131, and the handle 1334 is located outside the fixed component 131. The handle 1334 is pivotable relative to the insertion body 1333 to move the engagement portion 1322 of the engagement component 132 to retract into the wide portion 1315 of the slide channel 1311 from the first opening 1312 of the fixed component 131 for disengaging the engagement portion 1322 of the engagement component 132 from the positioning hole 221 of the positioning plate 22 of the casing 20.

Figure 5:
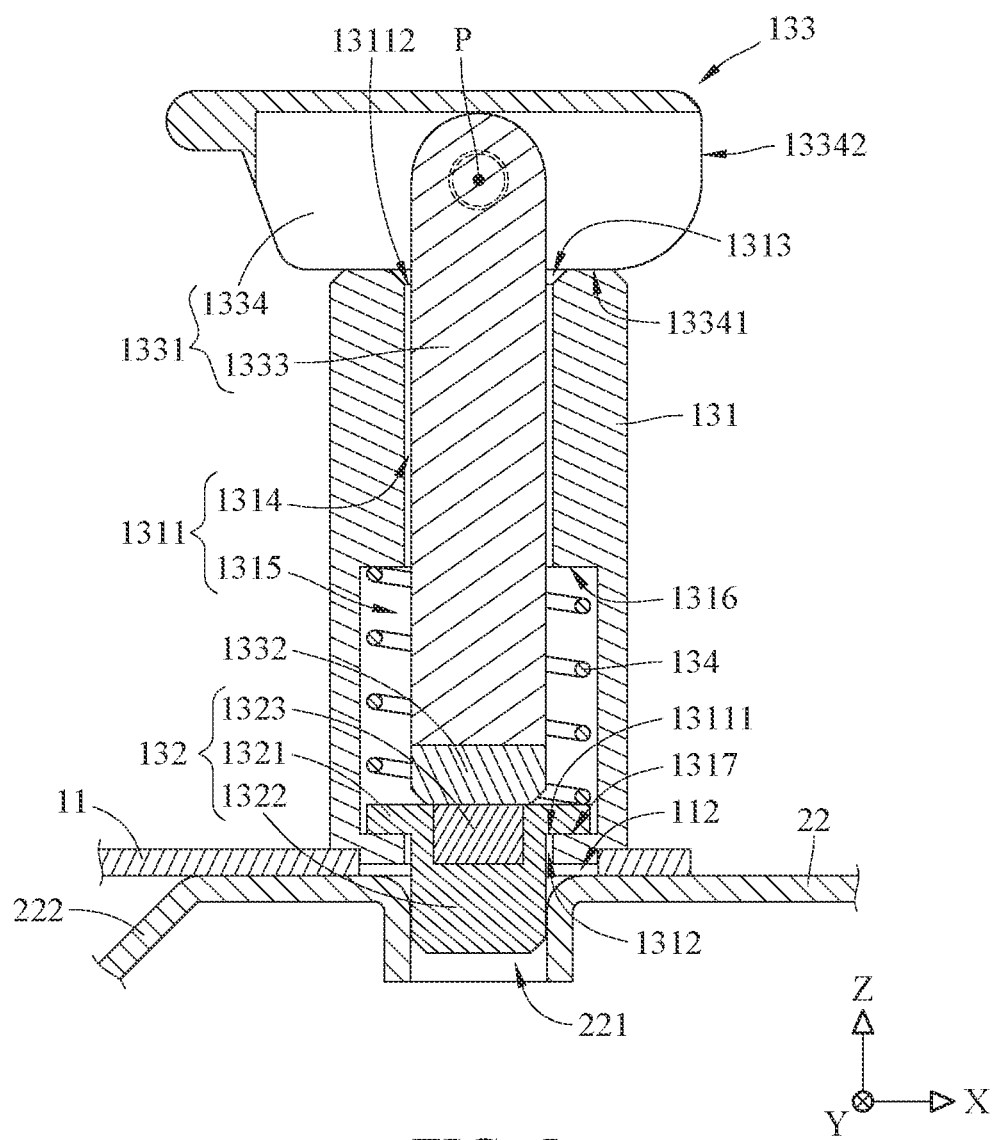
FIG. 5 is a partial cross-sectional view of the electronic assembly and the casing in FIG. 4 when a disengagement component is inserted into a fixed component.
Figure 6:
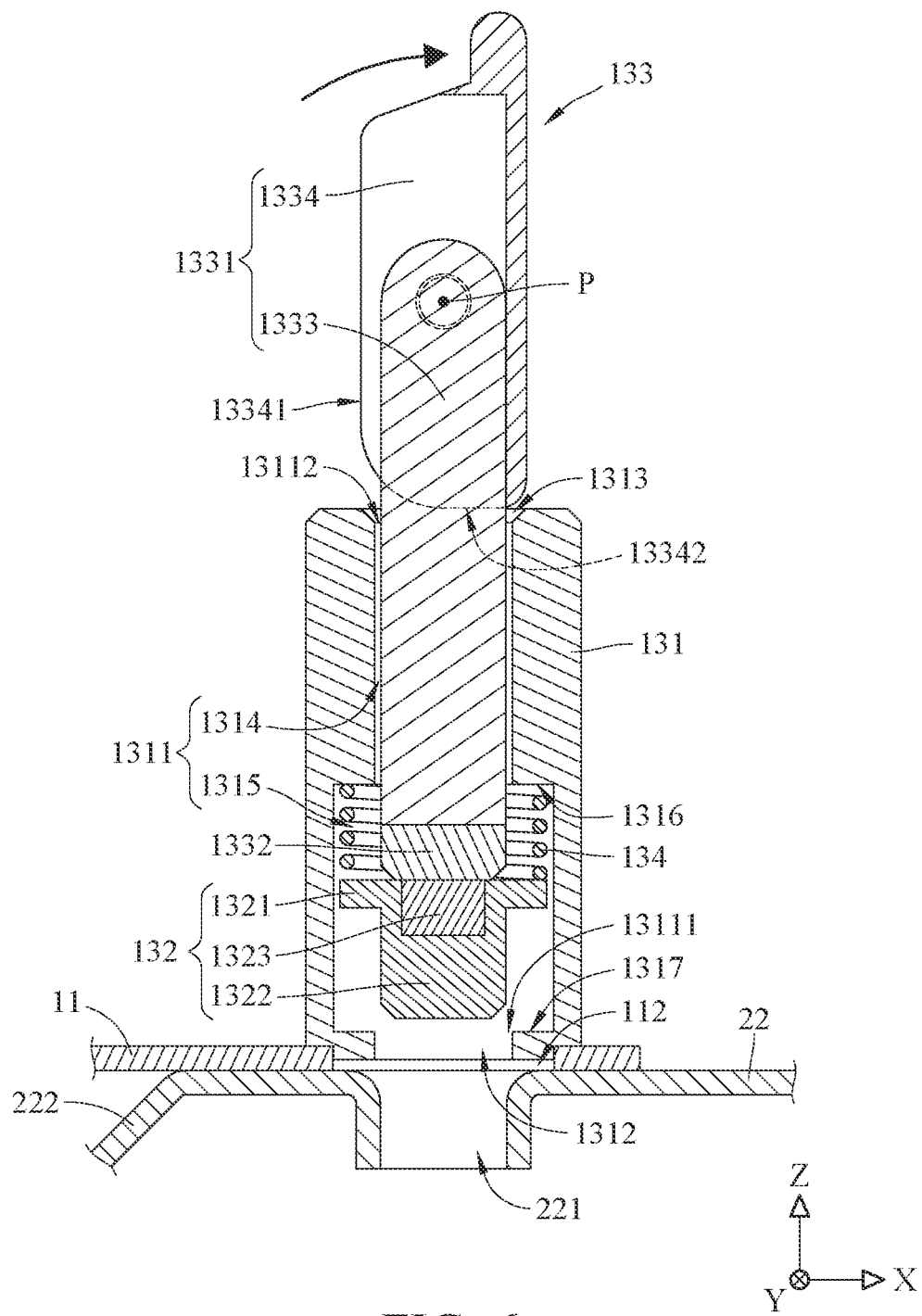
FIG. 6 is a partial cross-sectional view of the electronic assembly and the casing in FIG. 5 when the disengagement component moves an engagement component to retract into a slide channel of the fixed component.
Figure 7:
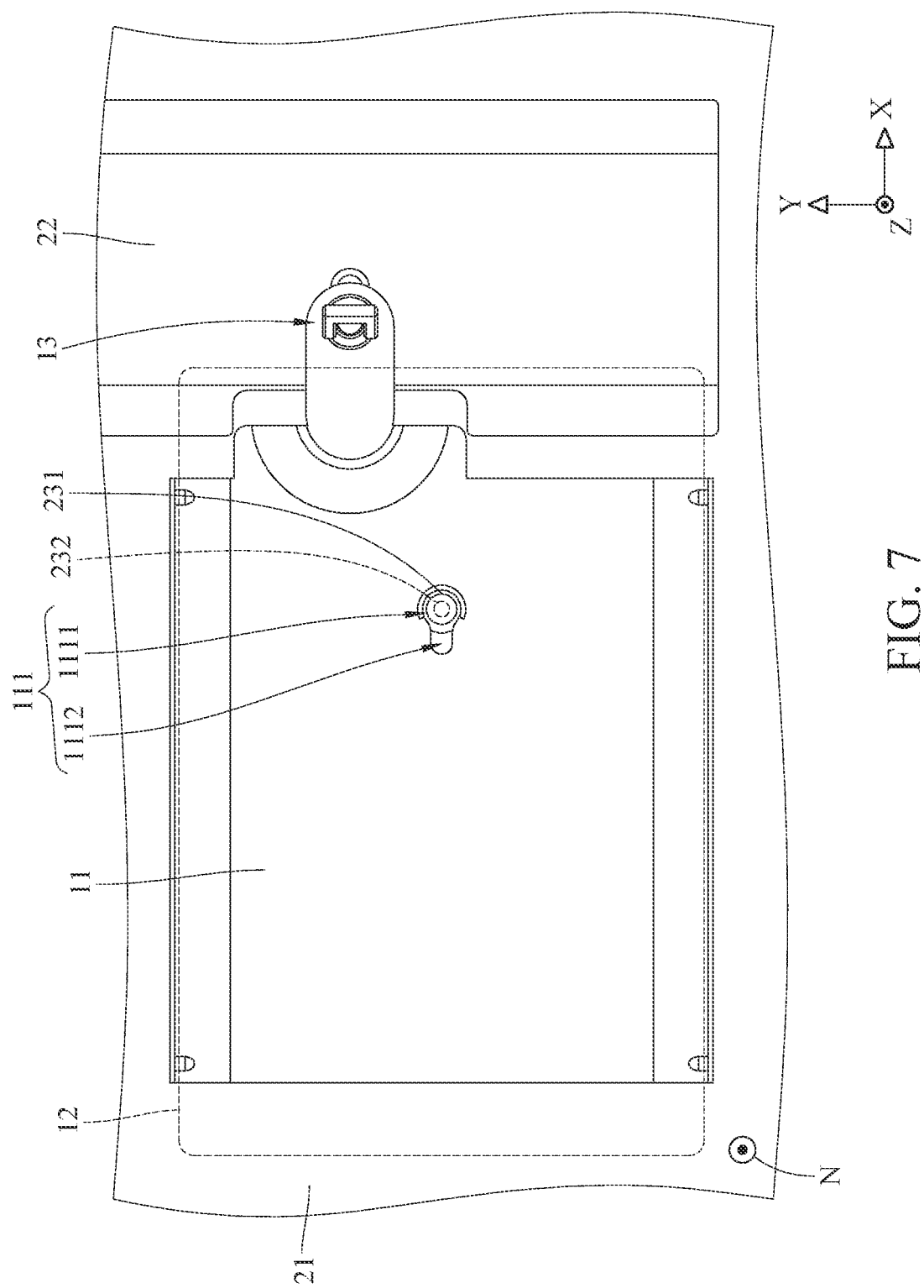
FIG. 7 is a top view of the electronic assembly and the casing in FIG. 3 when a tray is moved relative to the casing.

Referring to FIGS. 5 to 7, FIG. 5 is a partial cross-sectional view of the electronic assembly 10 and the casing 20 in FIG. 4 when the disengagement component 133 is inserted into the fixed component 131, FIG. 6 is a partial cross-sectional view of the electronic assembly 10 and the casing 20 in FIG. 5 when the disengagement component 133 moves the engagement component 132 to retract into the slide channel 1311 of the fixed component 131, and FIG. 7 is a top view of the electronic assembly 10 and the casing 20 in FIG. 3 when the tray 11 is moved relative to the casing 20.

As shown in FIG. 5, in a case that the tray 11 is fixed to the casing 20, when the tray 11 is required to be removed from the casing 20, a user can insert the insertion body 1333 of the main portion 1331 of the disengagement component 133 into the slide channel 1311 from the second opening 1313 of the fixed component 131, such that the first contact surface 13341 of the handle 1334 is in contact with one end of the fixed component 131 located farther away from the tray 11, and the second magnetic portion 1332 of the disengagement component 133 is attracted to the first magnetic portion 1323 of the engagement component 132. Then, as shown in FIG. 6, the user can rotate the handle 1334 to allow the second contact surface 13342 of the handle 1334 to contact the end of the fixed component 131 located farther away from the tray 11 so as to move the insertion body 1333 upwards. During the upward movement of the insertion body 1333, the second magnetic portion 1332 of the disengagement component 133 attracts the first magnetic portion 1323 of the engagement component 132 to move upward to be located closer to the another side 13112 of the slide channel 1311, such that the engagement portion 1322 of the engagement component 132 is removed from the positioning hole 221 of the positioning plate 22 of the casing 20. As a result, the engagement portion 1322 of the engagement component 132 is disengaged from the positioning hole 221 of the positioning plate 22 of the casing 20. In this embodiment as shown in figures, the engagement portion 1322 of the engagement component 132 retracts into the wide portion 1315 of the slide channel 1311 from the first opening 1312 of the fixed component 131, thereby preventing the engagement portion 1322 from interfering with the casing 20 when the tray 11 is horizontally moved relative to the casing 20. Then, as shown in FIG. 7, the tray 11 can be horizontally moved relative to the support plate 21 along the X-axis direction, such that the neck portion 232 of the positioning pillar 23 of the casing 20 is located at the wide portion 1111 of the positioning hole 111 of the tray 11. Therefore, the tray 11 can be vertically moved upwards relative to the support plate 21 along the Z-axis direction so as to be removed from the casing 20.

In this embodiment, the slidable portion 1321 of the engagement component 132 is slidably hidden in the slide channel 1311 of the fixed component 131, and the disengagement component 133 is removably inserted into the slide channel 1311 of the fixed component 131, such that not everyone can move the engagement component 132 for disengaging the engagement portion 1322 of the engagement component 132 from the positioning hole 221 of the positioning plate 22 of the casing 20. In other words, when the electronic assembly 10 is required to be removed from the casing 20, only specific people having the disengagement component 133 can insert the disengagement component 133 into the slide channel 1311 of the fixed component 131 to disengage the engagement portion 1322 of the engagement component 132 from the positioning hole 221 of the positioning plate 22 of the casing 20. As a result, the electronic assembly 10 is prevented from being accidently removed from the casing 20 by other people, and the electronic assembly 10 is prevented from being stolen by irrelevant people.

When the electronic assembly 10 is required to be fixed to the casing 20, the disengagement component 133 can be firstly inserted into the slide channel 1311 of the fixed component 131 for using the second magnetic portion 1332 to attract the first magnetic portion 1323 of the engagement component 132, such that the engagement portion 1322 of the engagement component 132 is retracted into the slide channel 1311 of the fixed component 131. In some scenarios, the handle 1334 may be maintained in the state shown in FIG. 6 for maintaining the engagement portion 1322 to be in a position where the engagement portion 1322 is retracted into the slide channel 1311 of the fixed component 131. Then, the positioning pillar 23 of the casing 20 is engaged into the positioning hole 111 of the tray 11. After the engagement portion 1322 of the engagement component 132 is aligned with the positioning hole 221 of the positioning plate 22 of the casing 20, the disengagement component 133 is removed from the fixed component 131 for enabling the elastic component 134 to move the engagement portion 1322 of the engagement component 132 to stick out of the slide channel 1311 of the fixed component 131 and insert into the positioning hole 221 of the positioning plate 22 of the casing 20.

Alternatively, during the installation of the electronic assembly 10 on the casing 20, the disengagement component 133 may not be used. For example, the positioning plate 22 of the casing 20 has an inclined plate portion 222. By sliding the tray 11, the engagement portion 1322 of the engagement component 132 can press against the inclined plate portion 222 of the positioning plate 22 so as to be moved upwards and compress the elastic component 134. After the engagement portion 1322 of the engagement component 132 is aligned with the positioning hole 221 of the positioning plate 22, the elastic component 134 automatically forces the engagement portion 1322 of the engagement component 132 to move downwards and insert into the positioning hole 221 of the positioning plate 22, thereby engaging the engagement component 132 with the positioning plate 22.

Note that the structure of the disengagement component 133 is not restricted in the disclosure; in some other embodiments, the disengagement component may not have the handle, and the user can directly pull the insertion body to disengage the engagement component from the positioning plate of the casing.

In addition, the slidable portion 1321 of the engagement component 132 is not restricted to being hidden in the slide channel 1311 of the fixed component 131; in some other embodiments, the slidable portion of the engagement component may be merely located in the slide channel of the fixed component, but not hidden in the slide channel of the fixed component.

In this embodiment, the first magnetic portion 1323 of the engagement component 132 is a temporary magnet, so that the first magnetic portion 1323 does not exhibit magnetism when not being magnetized, and thus the first magnetic portion 1323 does not adversely affect the operation of the electronic device 12. When there are other means used to prevent the electronic device 12 from being affected by magnetism, the first magnetic portion of the engagement component and the second magnetic component of the disengagement component may be a permanent magnet and a temporary magnet, or both of them may be permanent magnets in some other embodiments.

Note that the second opening 1313 of the fixed component 131 is not restricted to being the round opening, and the insertion body 1333 of the disengagement component 133 is not restricted to being the cylindrical pillar. As long as the insertion body of the disengagement component can be inserted into the second opening of the fixed component, the insertion body of the disengagement component and the second opening of the fixed component may be modified to be other shapes. For example, the insertion body of the disengagement component may be a triangular or rectangular pillar, and the second opening of the fixed component may be maintained to be the round opening, or may be modified to have a corresponding shape.

Figure 8:
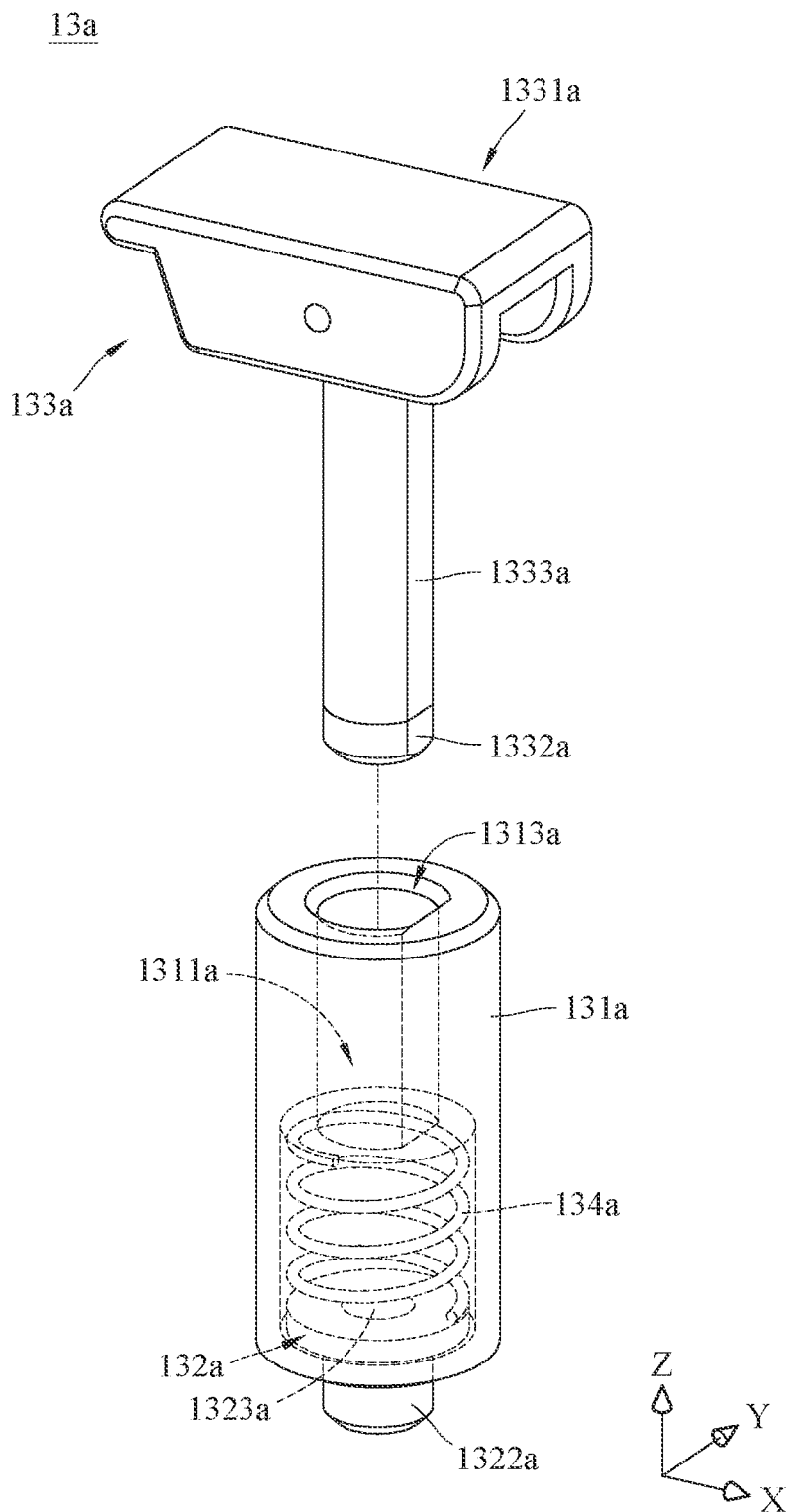
FIG. 8 is an exploded view of a quick release mechanism according a second embodiment of the disclosure.

Then, referring to FIG. 8, FIG. 8 is an exploded view of a quick release mechanism 13a according a second embodiment of the disclosure.

The quick release mechanism 13a of this embodiment is similar to the quick release mechanism 13 with reference to FIG. 4, and also includes a fixed component 131a, an engagement component 132a, a disengagement component 133a and an elastic component 134a. The main difference between the quick release mechanism 13a of this embodiment and the quick release mechanism 13 with reference to FIG. 4 is the shape of the second opening of the fixed component and the shape of the insertion body of the main body of the disengagement component, and thus the following paragraphs mainly introduce a shape of a second opening 1313a of the fixed component 131a and a shape of an insertion body 1333a of a main portion 1331a of the disengagement component 133a, and the structures of other parts of this embodiment and the connection relationship thereamong can be referred to the previous paragraphs with reference to FIG. 4 and will not be repeatedly introduced hereinafter.

In this embodiment, the second opening 1313a of the fixed component 131a is a non-round opening, and the insertion body 1333a of the main portion 1331a of the disengagement component 133a is a non-cylindrical pillar fitting the second opening 1313a. As a result, the insertion body 1333 of the main portion 1331 of the disengagement component 133 shown in FIG. 4 is unable to penetrate through the second opening 1313a of the fixed component 131a, while only the insertion body 1333a of the main portion 1331a of the disengagement component 133a is able to penetrate through the second opening 1313a of the fixed component 131a and be inserted into a slide channel 1311a for enabling a second magnetic portion 1332a on the insertion body 1333a to attract a first magnetic portion 1323a of the engagement component 132a to retract an engagement portion 1322a of the engagement component 132a into the slide channel 1311a of the fixed component 131a.

In addition, in this embodiment, the insertion body 1333a of the main portion 1331a of the disengagement component 133a not only can penetrate through the second opening 1313a of the fixed component 131a and be inserted into the slide channel 1311a, but also can penetrate through the second opening 1313 of the fixed component 131 shown in FIG. 4 and be inserted into the slide channel 1311. Therefore, the second magnetic portion 1332a on the insertion body 1333a also can attract the first magnetic portion 1323 of the engagement component 132 so as to retract the engagement portion 1322 of the engagement component 132 into the slide channel 1311 of the fixed component 131.

Figure 9:
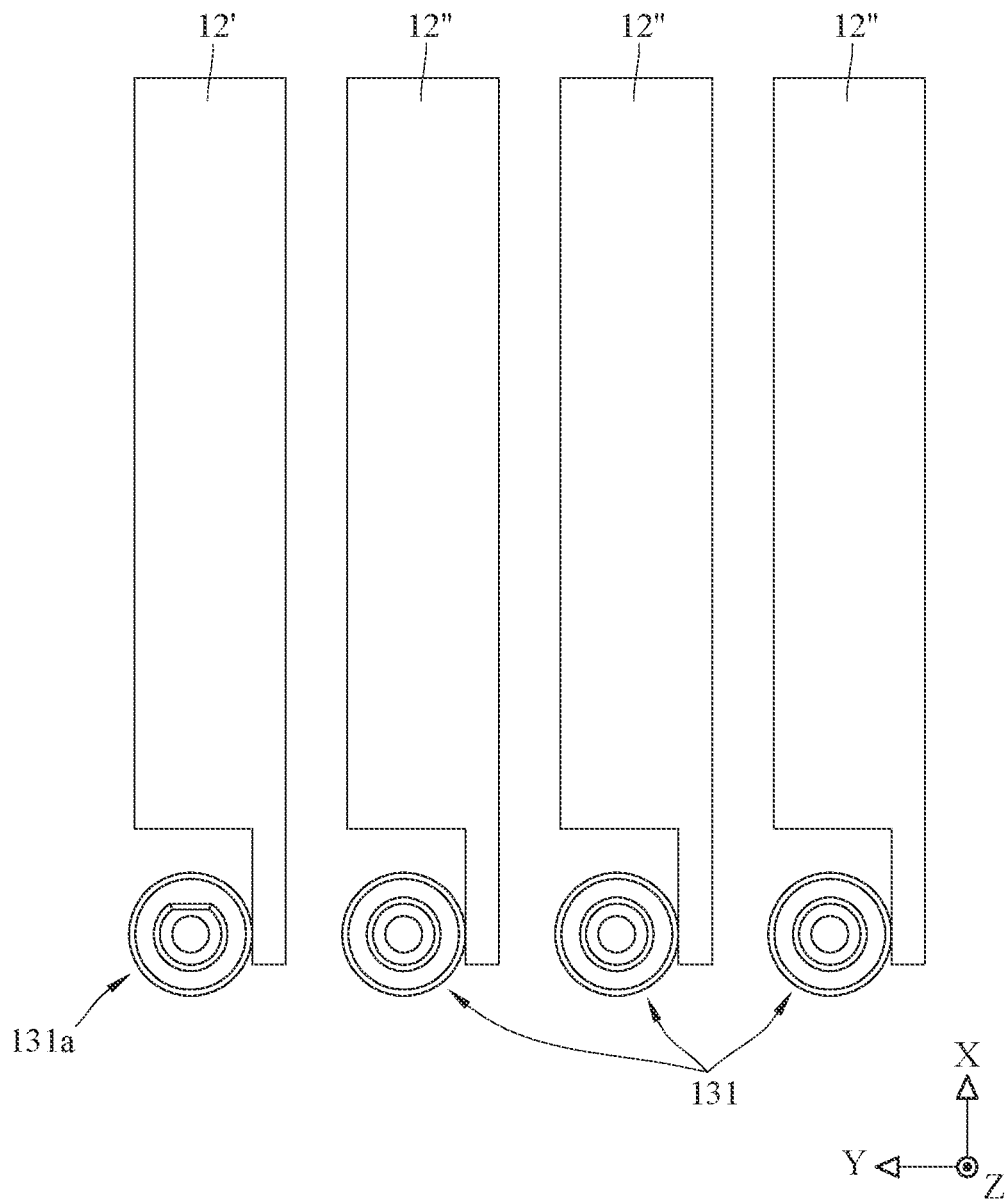
FIG. 9 is a top view of the quick release mechanisms in FIGS. 4 and 8 and electronic devices cooperated therewith.

The quick release mechanisms 13 and 13a of the aforementioned embodiments can be applied to a plurality of electronic devices. Referring to FIGS. 4 and 8-9, FIG. 9 is a top view of the quick release mechanisms 13 and 13a in FIGS. 4 and 8 and electronic devices 12' and 12" cooperated therewith.

In these electronic devices, one electronic device 12' is cooperated with the fixed component 131a shown in FIG. 8, and this electronic device 12' is, for example, a hard disk drive storing confidential information or important drivers. The other electronic devices 12" are cooperated with the fixed components 131 shown in FIG. 4, and these electronic devices 12" are, for example, hard disk drives storing non-confidential information. As a result, the disengagement component 133a shown in FIG. 8 can be inserted into not only the fixed component 131a, but also the fixed component 131, and thus the disengagement component 133a shown in FIG. 8 enables the engagement components 132a and 132 in the fixed components 131a and 131 to disengage from the casing (not shown). On the other hand, since the disengagement component 133 shown in FIG. 4 is unable to be inserted into the fixed component 131a, but only can be inserted into other fixed components 131, and thus the disengagement component 133 shown in FIG. 4 can only enable the engagement components 132 in the fixed components 131 to disengage from the casing. Therefore, staffs can be distinguished to have different access levels, and the staffs with high access level hold the disengagement component 133a shown in FIG. 8, while the staffs with low access level hold the disengagement component 133 shown in FIG. 4, and thus the more important electronic device 12' can be prevented from being accidently removed by the staff with low access level.

Figure 10:
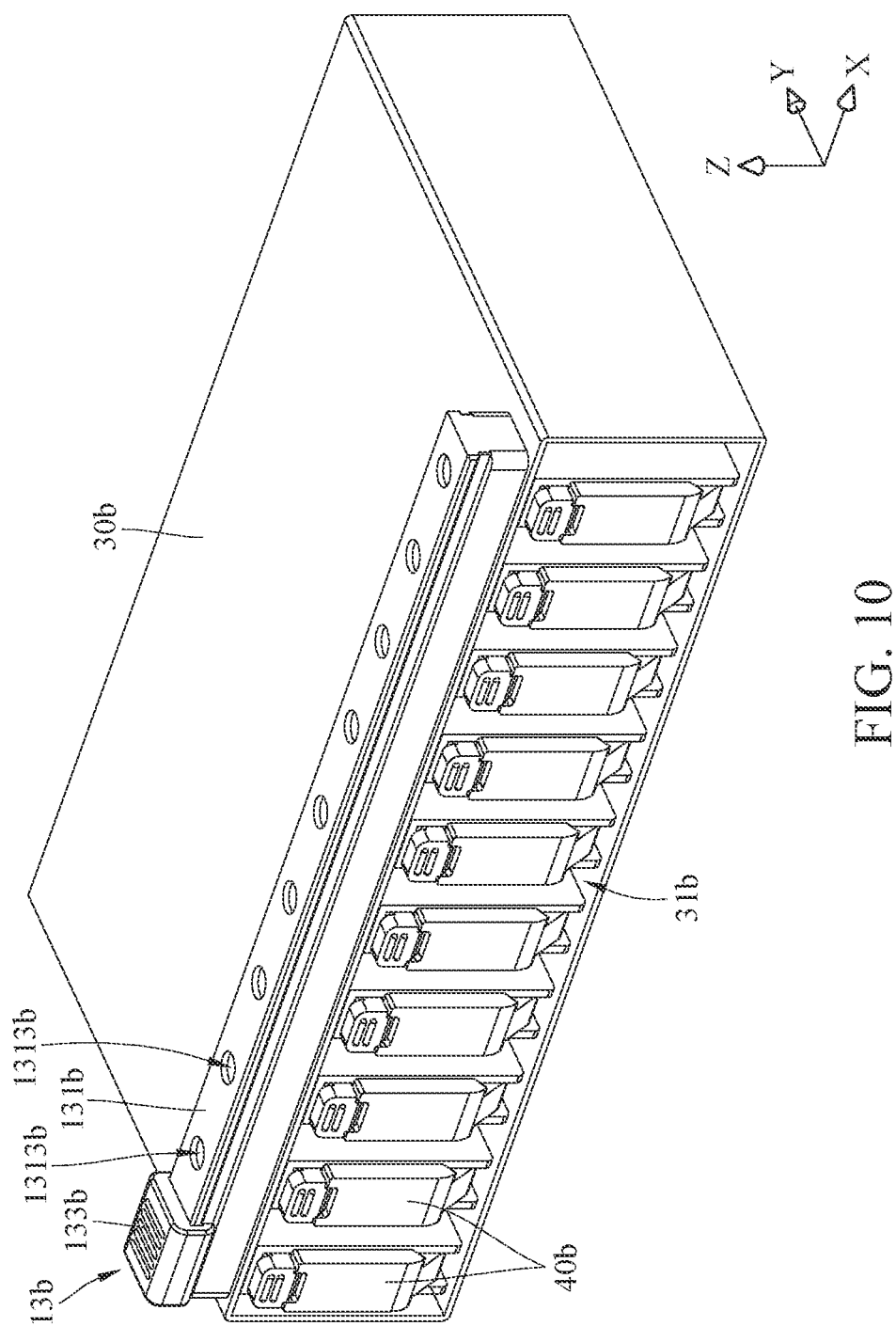
FIG. 10 is a perspective view of a quick release mechanism, a casing and electronic devices according to a third embodiment of the disclosure.
Figure 11:
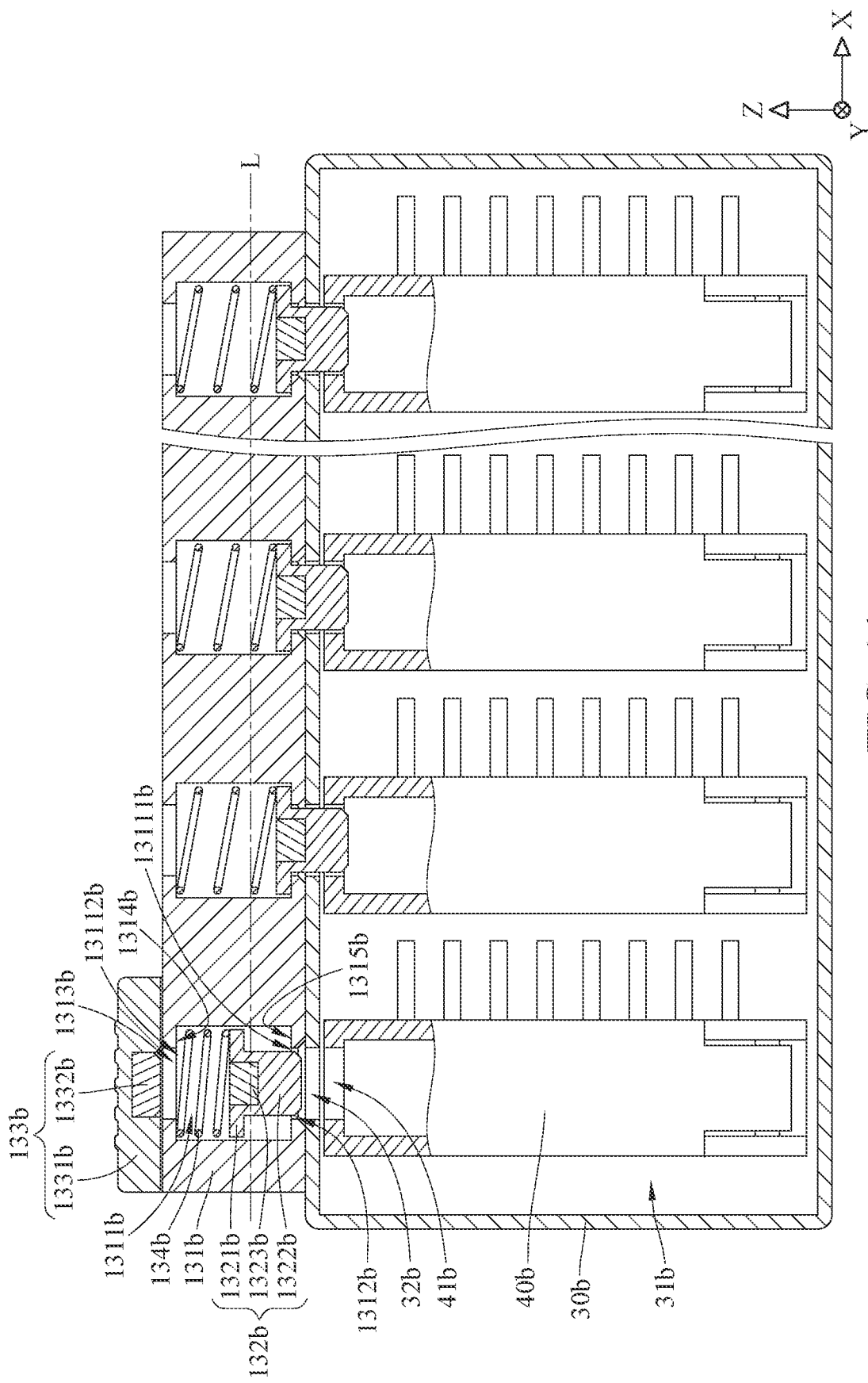
FIG. 11 is a partial cross-sectional view of the quick release mechanism, the casing and the electronic devices in FIG. 10.

In the aforementioned embodiments, the quantity of the slide channel of the fixed component is one, but the disclosure is not limited thereto. For example, referring to FIGS. 10 and 11, FIG. 10 is a perspective view of a quick release mechanism 13b, a casing 30b and electronic devices 40b according to a third embodiment of the disclosure, and FIG. 11 is a partial cross-sectional view of the quick release mechanism 13b, the casing 30b and the electronic devices 40b in FIG. 10.

In this embodiment, the quick release mechanism 13b is cooperated with the casing 30b. The casing 30b has an accommodation space 31b and a plurality of through holes 32b communicating with the accommodation space 31b. The accommodation space 31b is configured to accommodate the electronic devices 40b (e.g., hard disk drives), and the through holes 32b are configure to be aligned with positioning holes 41b of the electronic devices 40b, respectively.

The quick release mechanism 13b includes a fixed component 131b, a plurality of engagement components 132b, a disengagement component 133b and a plurality of elastic components 134b.

The fixed component 131b is, for example, a slide rail. The fixed component 131b is disposed on the casing 30b. The fixed component 131b has a plurality of slide channels 1311b, a plurality of first openings 1312b and a plurality of second openings 1313b. The slide channels 1311b are arranged along a straight line, the first openings 1312b and the second openings 1313b respectively communicate with opposite sides of the slide channels 1311b, and the first openings 1312b are respectively aligned with the through holes 32b of the casing 30b. Taking one slide channel 1311b and the first opening 1312b and the second opening 1313b which communicate with this slide channel 1311b for instance, the first opening 1312b communicates with one side 13111b of the slide channel 1311b, and the second opening 1313b communicates with another side 13112b of the slide channel 1311b. Inner diameters of the first opening 1312b and the second opening 1313b are smaller than an inner diameter of the slide channel 1311b, a first contact surface 1314b is formed at a place where the slide channel 1311b communicates with the second opening 1313b, and a second contact surface 1315b is formed at a place where the slide channel 1311b communicates with the first opening 1312b.

The engagement components 132b are respectively disposed in the slide channels 1311b of the fixed component 131b. The engagement components 132b are the same in structure, and thus the following merely introduces one of them. The engagement component 132b includes a slidable portion 1321b, an engagement portion 1322b and a first magnetic portion 1323b. The engagement portion 1322b is connected to the slidable portion 1321b, and an outer diameter of the engagement portion 1322b is smaller than an outer diameter of the slidable portion 1321b. The slidable portion 1321b is slidably hidden in the slide channel 1311b of the fixed component 131b. The engagement portion 1322b sticks out of the slide channel 1311b from the first opening 1312b of the fixed component 131b. The engagement portion 1322b is configured to penetrate through the through hole 32b of the casing 30b and be inserted into the positioning hole 41b of the electronic device 40b for fixing the electronic device 40b to the casing 30b. The first magnetic portion 1323b is, for example, a temporary magnet. The first magnetic portion 1323b is disposed on the slidable portion 1321b.

The elastic components 134b are, for example, compression springs. The elastic components 134b are respectively disposed in the slide channels 1311b of the fixed component 131b. Taking one of the elastic components 134b for instance, two opposite ends of the elastic component 134b are respectively in contact with the first contact surface 1314b and the slidable portion 1321b of the engagement component 132b. The elastic component 134b is configured to move the slidable portion 1321b to force the engagement portion 1322b to stick out of the slide channel 1311b from the first opening 1312b of the fixed component 131b. In other words, when there is no other force applied on the engagement portion 1322b, the elastic component 134b constantly forces the engagement portion 1322b to stick out of the slide channel 1311b from the first opening 1312b of the fixed component 131b, such that the engagement portion 1322b is maintained to penetrate through the through hole 32b of the casing 30b and be inserted into the positioning hole 41b of the electronic device 40b, and the slidable portion 1321b of the engagement component 132b is in contact with the second contact surface 1315b.

Note that the elastic components 134b are not restricted to being the compression springs. In some other embodiments, the elastic components may be extension springs, and two opposite ends of each extension spring are respectively fixed to the second contact surface and the slidable portion of the engagement component. In addition, the elastic components 134b may be optional components. In some other embodiments, the quick release mechanism may not have the elastic components, and the engagement portions may be maintained to stick out of the slide channels from the first openings of the fixed component to penetrate through the through holes of the casing and be inserted into the positioning holes of the electronic devices via gravity.

The disengagement component 133b includes a main portion 1331b and a second magnetic portion 1332b. The second magnetic portion 1332b is, for example, a permanent magnet, and the second magnetic portion 1332b is disposed on the main portion 1331b. The main portion 1331b is removably and slidably disposed on the fixed component 131b, such that the second magnetic portion 1332b corresponds to one of the second openings 1313b and the slide channel 1311b communicating with this second opening 1313b.

Specifically, in a case that the electronic devices 40b are fixed to the casing 30b, when one electronic device 40b is required to be removed from the casing 30b, a user can install the main portion 1331b of the disengagement component 133b on the fixed component 131b from one end of the fixed component 131b and slide the disengagement component 133b relative to the fixed component 131b, such that the second magnetic portion 1332b corresponds to one second opening 1313b and one slide channel 1311b communicating with this second opening 1313b. As a result, the second magnetic portion 1332b of the disengagement component 133b attracts the first magnetic portion 1323b of the engagement component 132b, such that the engagement portion 1322b of the engagement component 132b is moved upwards to be located closer to the another side 13112b of the slide channel 1311b. Therefore, the engagement portion 1322b is disengaged from the positioning hole 41b of the electronic device 40b and then is retracted into the slide channel 1311b from the first opening 1312b of the fixed component 131b. Accordingly, the electronic device 40b can be moved relative to the casing 30b so as to be removed from the casing 30b.

In this embodiment, the slidable portions 1321b of the engagement components 132b are slidably hidden in the slide channels 1311b of the fixed component 131b, and the main portion 1331b of the disengagement component 133b is removably disposed on the fixed component 131b, such that not everyone can move the engagement components 132b for disengaging the engagement portions 1322b of the engagement components 132b from the positioning holes 41b of the electronic devices 40b. In other words, when the electronic devices 40b are required to be removed the casing 30b, only specific people having the disengagement component 133b can install the disengagement component 133b on the fixed component 131b to disengage the engagement components 132b from the electronic devices 40b. As a result, the electronic devices 40b are prevented from being accidently removed from the casing 30b by other people, and the electronic devices 40b are prevented from being stolen by irrelevant people.

In this embodiment, the disengagement component 133b moves the engagement components 132b to disengage from the electronic devices 40b via magnetic attraction, and thus there is no connection component to connect the disengagement component 133b and each engagement component 132b, thereby saving material cost and spaces required by such connection component.

In this embodiment, the first magnetic portion 1323b of the engagement component 132b is a temporary magnet, so that the first magnetic portion 1323b does not exhibit magnetism when not being magnetized, and thus the first magnetic portion 1323b does not adversely affect the operations of the electronic devices 40b. When there are other means used to prevent the electronic devices from being affected by magnetism, the first magnetic portion of the engagement component and the second magnetic portion of the disengagement component may be a permanent magnet and a temporary magnet, or both of them may be permanent magnets in some other embodiments. In addition, the second openings 1313b of the fixed component 131b are optional structures and may be omitted in some other embodiments.

On the other hand, since the slide channels 1311b of the fixed component 131b are arranged along the straight line, the user can slide the disengagement component 133b to sequentially disengage the engagement components 132b in the slide channels 1311b from the electronic devices 40b according to the arrangement order of the slide channels 1311b, such that the electronic devices 40b can be sequentially removed from the casing 30b.

In this embodiment, the engagement portions 1322b of the engagement components 132b are the same in shape, but the disclosure is not limited thereto; in some other embodiments, the shapes of the engagement portions of the engagement components may be different from one another, and the shapes of the positioning holes of the electronic devices may respectively match the shapes of the engagement portions of the engagement components. Therefore, each electronic device is limited to be installed in a specific position, thereby preventing the electronic devices from being installed on incorrect positions.

In addition, the slidable portions 1321b of the engagement components 132b are not restricted to being hidden in the slide channels 1311b of the fixed component 131b. In some other embodiments, the slidable portions of the engagement components may be merely located in the slide channels of the fixed component, but not hidden in the slide channels of the fixed component.

Figure 12:
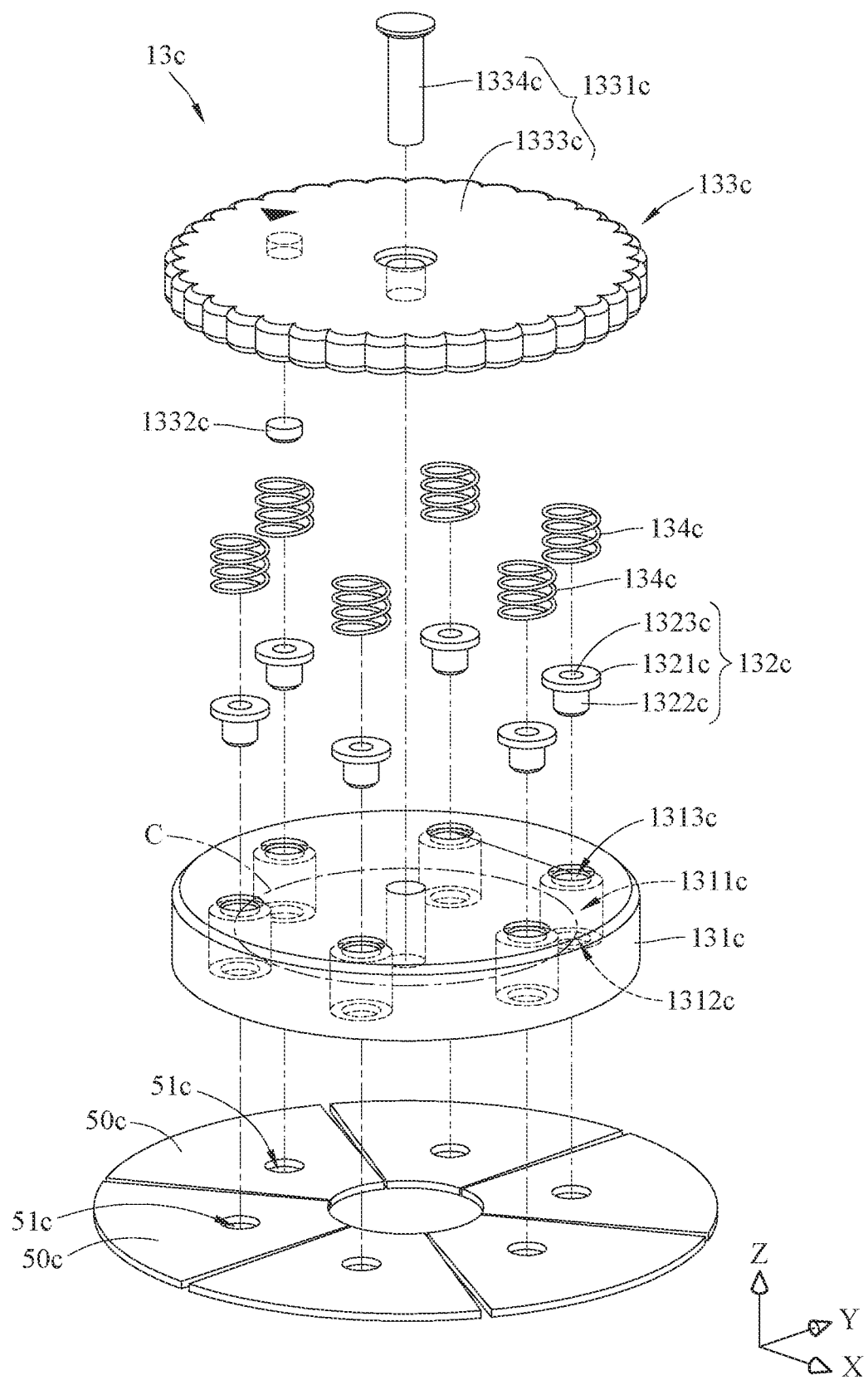
FIG. 12 is a perspective view of a quick release mechanism and casings according to a fourth embodiment of the disclosure.
Figure 13:
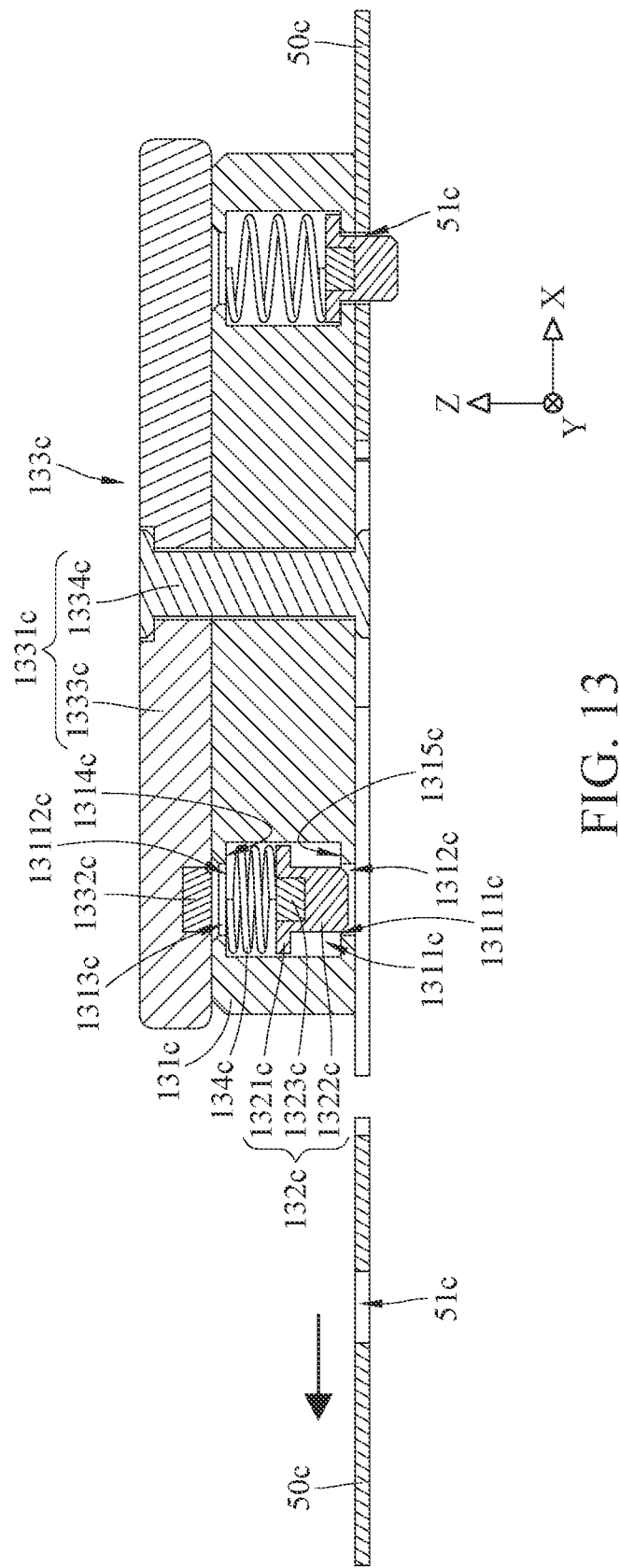
FIG. 13 is a cross-sectional view of the quick release mechanism and the casings in FIG. 12.

Then, referring to FIGS. 12 and 13, FIG. 12 is a perspective view of a quick release mechanism 13c and casings 50c according to a fourth embodiment of the disclosure, and FIG. 13 is a cross-sectional view of the quick release mechanism 13c and the casings 50c in FIG. 12.

In this embodiment, the quick release mechanism 13c is configured to be engaged with or disengaged from a plurality of casings 50c. The casings 50c are, for example, casings of an electronic assemblies, such as hard disk drive assemblies or expansion card assemblies. Each of the casings 50c has a positioning hole 51c.

The quick release mechanism 13c includes a fixed component 131c, a plurality of engagement components 132c, a disengagement component 133c and a plurality of elastic components 134c.

The fixed component 131c has a plurality of slide channels 1311c, a plurality of first openings 1312c and a plurality of second openings 1313c. The slide channels 1311c are arranged along a circle, and the first openings 1312c and the second openings 1313c respectively communicate with opposite ends of the slide channels 1311c, and the first openings 1312c are respectively aligned with the positioning holes 51c of the casings 50c. Taking one slide channel 1311c and the first opening 1312c and the second opening 1313c which communicate with this slide channel 1311c for instance, the first opening 1312c communicates with one side 13111c of the slide channel 1311c, and the second opening 1313c communicates with another side 13112c of the slide channel 1311c. Inner diameters of the first opening 1312c and the second opening 1313c are smaller than an inner diameter of the slide channel 1311c, a first contact surface 1314c is formed at a place where the slide channel 1311c communicates with the second opening 1313c, and a second contact surface 1315c is formed at a place where the slide channel 1311c communicates with the first opening 1312c.

The engagement components 132c are respectively disposed in the slide channels 1311c of the fixed component 131c. The engagement components 132c are the same in structure, and thus the following merely introduces one of them. The engagement component 132c includes a slidable portion 1321c, an engagement portion 1322c and a first magnetic portion 1323c. The engagement portion 1322c is connected to the slidable portion 1321c, and an outer diameter of the engagement portion 1322c is smaller than an outer diameter of the slidable portion 1321c. The slidable portion 1321c is slidably hidden in the slide channel 1311c of the fixed component 131c. The engagement portion 1322c sticks out of the slide channel 1311c from the first opening 1312c of the fixed component 131c. The engagement portion 1322c is configured to be inserted into the positioning hole 51c of the casing 50c for fixing the casing 50c. The first magnetic portion 1323c is, for example, a temporary magnet. The first magnetic portion 1323c is disposed on the slidable portion 1321c.

The elastic components 134c are, for example, compression springs. The elastic components 134c are respectively disposed in the slide channels 1311c of the fixed component 131c. Taking one of the elastic components 134c for instance, two opposite ends of the elastic component 134c are respectively in contact with the first contact surface 1314c and the slidable portion 1321c of the engagement component 132c. The elastic component 134c is configured to move the slidable portion 1321c to force the engagement portion 1322c to stick out of the slide channel 1311c from the first opening 1312c of the fixed component 131c. In other words, when there is no other force applied on the engagement portion 1322c, the elastic component 134c constantly forces the engagement portion 1322c to stick out of the slide channel 1311c from the first opening 1312c of the fixed component 131c, such that the engagement portion 1322c is maintained to be inserted into the positioning hole 51c of the casing 50c, and the slidable portion 1321c of the engagement component 132c is in contact with the second contact surface 1315c.

Note that the elastic components 134c are not restricted to being the compression springs. In some other embodiments, the elastic components may be extension springs, and two opposite ends of each extension spring are respectively fixed to the second contact surface and the slidable portion of the engagement component. In addition, the elastic components 134c may be optional components. In some other embodiments, the quick release mechanism may not have the elastic components, and the engagement portions may be maintained to stick out of the slide channels from the first openings of the fixed component to be inserted into the positioning holes of the casing via gravity.

The disengagement component 133c includes a main portion 1331c and a second magnetic portion 1332c. The main portion 1331c includes a rotatable plate 1333c and a shaft 1334c. The rotatable plate 1333c is removably and rotatably disposed on the fix component 131c via the shaft 1334c. The second magnetic portion 1332c is, for example, a permanent magnet, and the second magnetic portion 1332c is disposed on the rotatable plate 1333c. The second magnetic portion 1332c is configured to correspond to one second opening 1313c and one slide channel 1311c communicating with this second opening 1313c.

Specifically, when one casing 50c is required to be removed, a user can install the main portion 1331c of the disengagement component 133c on the fixed component 131c and rotate the rotatable plate 1333c relative to the fixed component 131c, such that the second magnetic portion 1332c corresponds to one second opening 1313c and one slide channel 1311c communicating with this second opening 1313c. As a result, the second magnetic portion 1332c of the disengagement component 133c attracts the first magnetic portion 1323c of the engagement component 132c, such that the engagement portion 1322c of the engagement component 132c is moved upwards to be located closer to the another side 13112c of the slide channel 1311c. Therefore, the engagement portion 1322c is disengaged from the positioning hole 51c of the casing 50c and then is retracted into the slide channel 1311c from the first opening 1312c of the fixed component 131c. Accordingly, the casing 50c can be removed.

In this embodiment, the slidable portions 1321c of the engagement components 132c are slidably hidden in the slide channels 1311c of the fixed component 131c, and the main portion 1331c of the disengagement component 133c is removably disposed on the fixed component 131c, such that not everyone can move the engagement components 132c for disengaging the engagement portions 1322c of the engagement components 132c from the positioning holes 51c of the casings 50c. In other words, when the casings 50c are required to be removed, only specific people having the disengagement component 133c can install the disengagement component 133c on the fixed component 131c to disengage the engagement components 132c from the casings 50c. As a result, the electronic assemblies are prevented from being accidently removed by other people, and the electronic assemblies are prevented from being stolen by irrelevant people.

In this embodiment, the disengagement component 133c moves the engagement components 132c to disengage from the casing 50c via magnetic attraction, and thus there is no connection component to connect the disengagement component 133c and each engagement component 132c, thereby saving material cost and spaces required by such connection component.

In this embodiment, the first magnetic portion 1323c of the engagement component 132c is a temporary magnet, so that the first magnetic portion 1323c does not exhibit magnetism when not being magnetized, and thus the first magnetic portion 1323c does not adversely affect the operations of the electronic assemblies. When there are other means used to prevent the electronic assemblies from being affected by magnetism, the first magnetic portion of the engagement component and the second magnetic portion of the disengagement component may be a permanent magnet and a temporary magnet, or both of them may be permanent magnets in some other embodiments. In addition, the second openings 1313c of the fixed component 131c are optional structures and may be omitted in some other embodiments.

On the other hand, since the slide channels 1311c of the fixed component 131c are arranged along a circle, the user can rotate the disengagement component 133c to sequentially disengage the engagement components 132c in the slide channels 1311c from the casings 50c according to the arrangement order of the slide channels 1311c, such that the casings 50c can be sequentially removed.

In this embodiment, the engagement portions 1322c of the engagement components 132c are the same in shape, but the disclosure is not limited thereto; in some other embodiments, the shapes of the engagement portions of the engagement components may be different from one another, and the shapes of the positioning holes of the casings may respectively match the shapes of the engagement portions of the engagement components. Therefore, each casing is limited to be installed in a specific position, thereby preventing the casings from being installed on incorrect positions.

In addition, the slidable portions 1321c of the engagement components 132c are not restricted to being hidden in the slide channels 1311c of the fixed component 131c. In some other embodiments, the slidable portions of the engagement components may be merely located in the slide channels of the fixed component, but not hidden in the slide channels of the fixed component.

Figure 14:
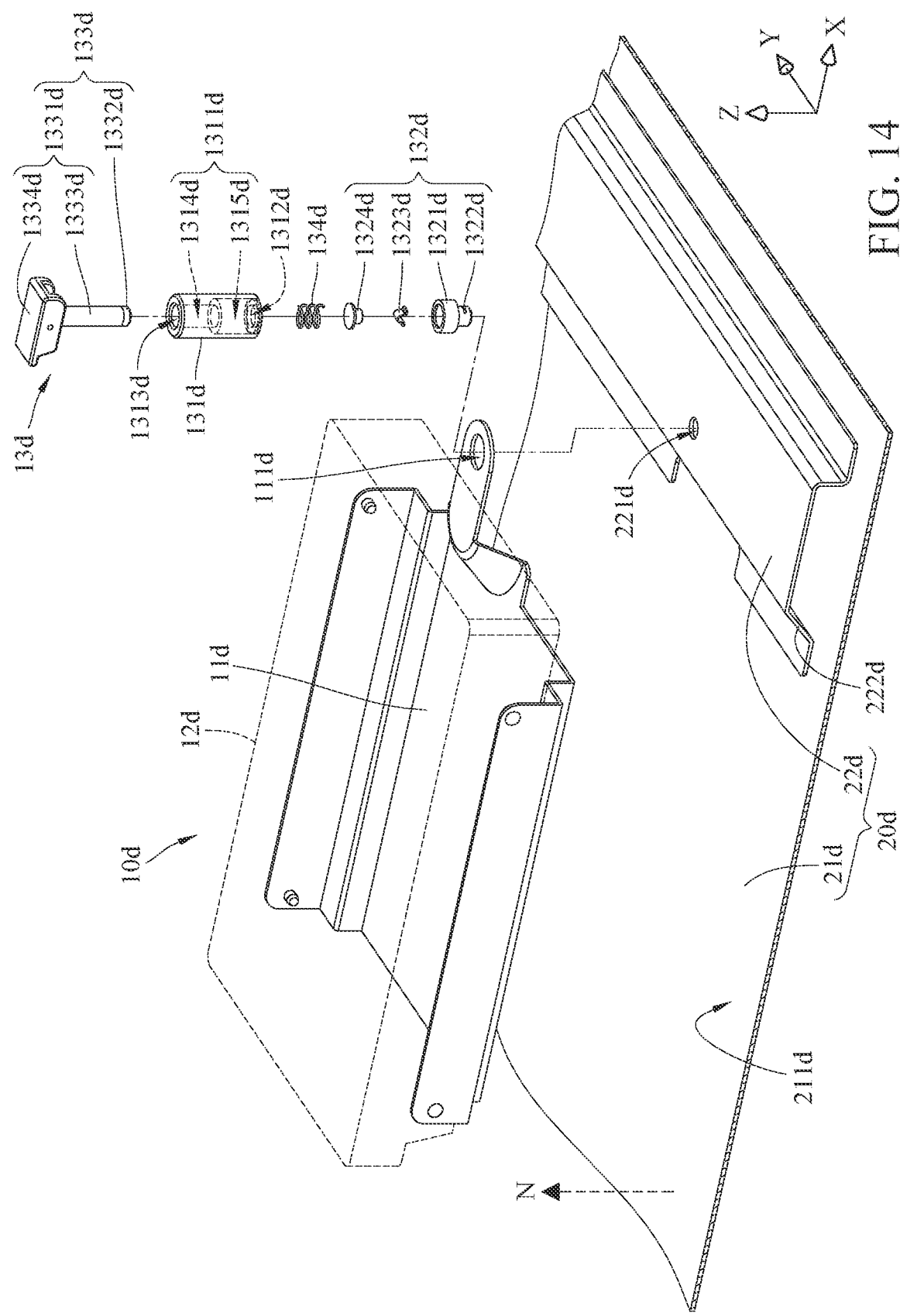
FIG. 14 is an exploded view of an electronic assembly and a casing according to a fifth embodiment of the disclosure.
Figure 15:
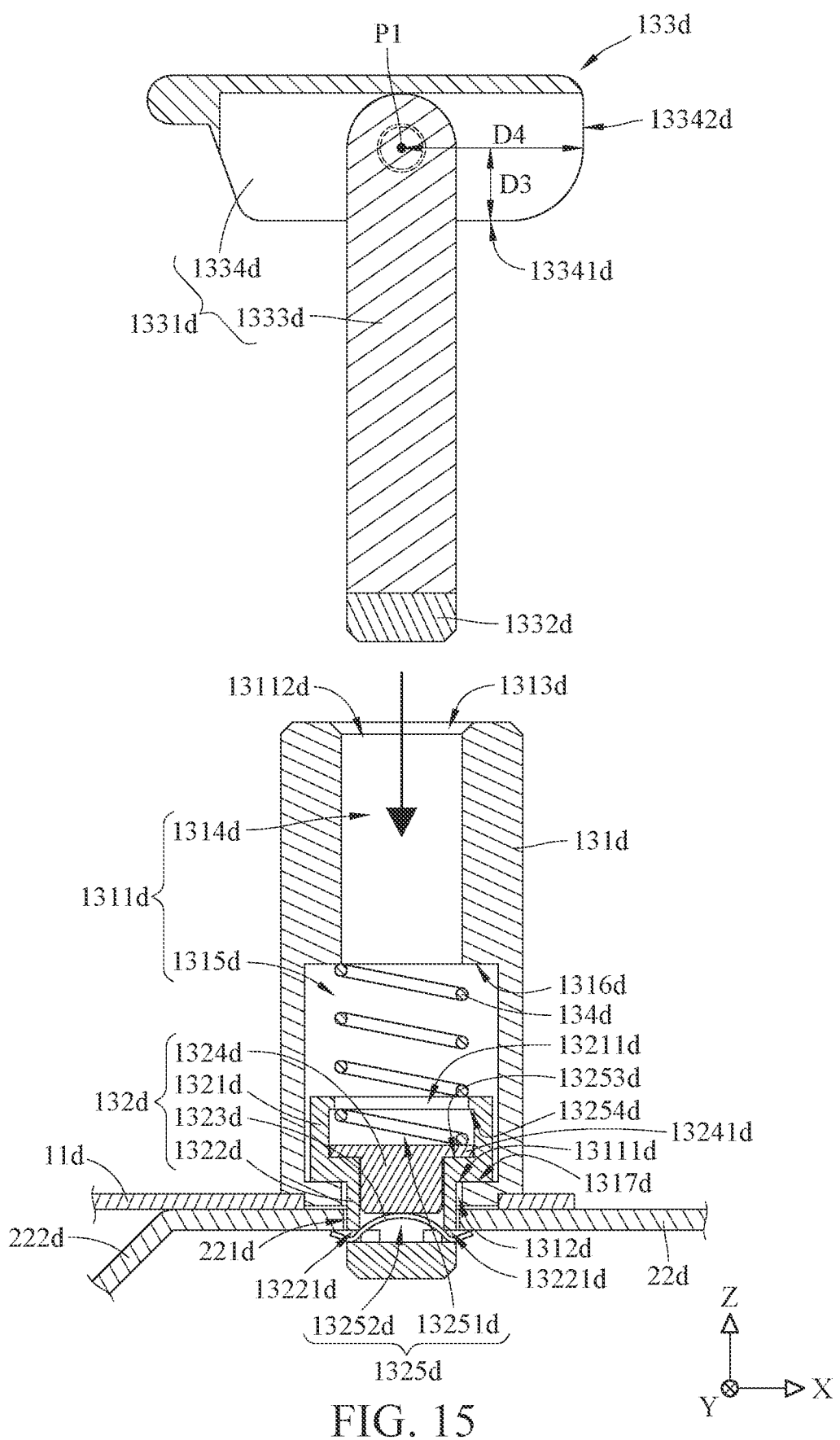
FIG. 15 is a partial cross-sectional view of the electronic assembly and the casing in FIG. 14.

Then, referring to FIGS. 14 and 15, FIG. 14 is an exploded view of an electronic assembly 10d and a casing 20d according to a fifth embodiment of the disclosure, and FIG. 15 is a partial cross-sectional view of the electronic assembly 10d and the casing 20d in FIG. 14.

In this embodiment, the electronic assembly 10d is, but not limited to, a hard disk drive assembly. The electronic assembly 10d is configured to be removably fixed to the casing 20d. The casing 20d is, for example, a server casing. The casing 20d includes a support plate 21d and a positioning plate 22d. The positioning plate 22d is fixed on a surface 211d of the support plate 21d, and the positioning plate 22d has a positioning hole 221d. In a three-dimensional coordinate system, a Z-axis direction is defined as a vertical direction and is parallel to a normal line N of the surface 211d of the support plate 21d, and an X-axis direction and a Y-axis direction are defined as horizontal directions and are perpendicular to the normal line N of the surface 211d of the support plate 21d.

The electronic assembly 10d includes a tray 11d, an electronic device 12d and a quick release mechanism 13d.

The electronic device 12d is, for example, a hard disk drive. The electronic device 12d is fixed on the tray 11d. The tray 11d has a mount hole 111d, and the mount hole 111d is configured for the quick release mechanism 13d to be installed therein.

Specifically, the quick release mechanism 13d includes a fixed component 131d, an engagement component 132d and a disengagement component 133d. In addition, the quick release mechanism 13d may further include an elastic component 134d.

The fixed component 131d is fixed into the mount hole 111d of the tray 11d. The fixed component 131d has a slide channel 1311d, a first opening 1312d and a second opening 1313d. The slide channel 1311d has a narrow portion 1314d and a wide portion 1315d communicating with each other. An inner diameter of the wide portion 1315d is larger than an inner diameter of the narrow portion 1314d, and a first contact surface 1316d is formed at a place where the wide portion 1315d communicates with the narrow portion 1314d. The first opening 1312d communicates with one side of the wide portion 1315d located farther away from the narrow portion 1314d; that is, the first opening 1312d communicates with one side 13111d of the slide channel 1311d. An inner diameter of the first opening 1312d is smaller than the inner diameter of the wide portion 1315d, and a second contact surface 1317d is formed at a place where the first opening 1312d communicates with the wide portion 1315d.

The second opening 1313d is, for example, a round opening, and the second opening 1313d communicates with one side of the narrow portion 1314d of the slide channel 1311d located farther away from the wide portion 1315d; that is, the second opening 1313d communicates with another side 13112d of the slide channel 1311d.

The engagement component 132d includes a slidable portion 1321d, an engagement portion 1322d, a lateral engagement portion 1323d and a movable portion 1324d. The engagement portion 1322d is connected to the slidable portion 1321d, and an outer diameter of the engagement portion 1322d is smaller than an outer diameter of the slidable portion 1321d. The slidable portion 1321d is slidably hidden in the wide portion 1315d of the slide channel 1311d of the fixed component 131d. The engagement portion 1322d sticks out of the slide channel 1311d from the first opening 1312d of the fixed component 131d. The engagement portion 1322d is configured to be inserted into the positioning hole 221d of the positioning plate 22d of the casing 20d, such that the tray 11d is unable to be horizontally moved relative to the support plate 21d along the X-axis direction and the Y-axis direction.

Figure 16:
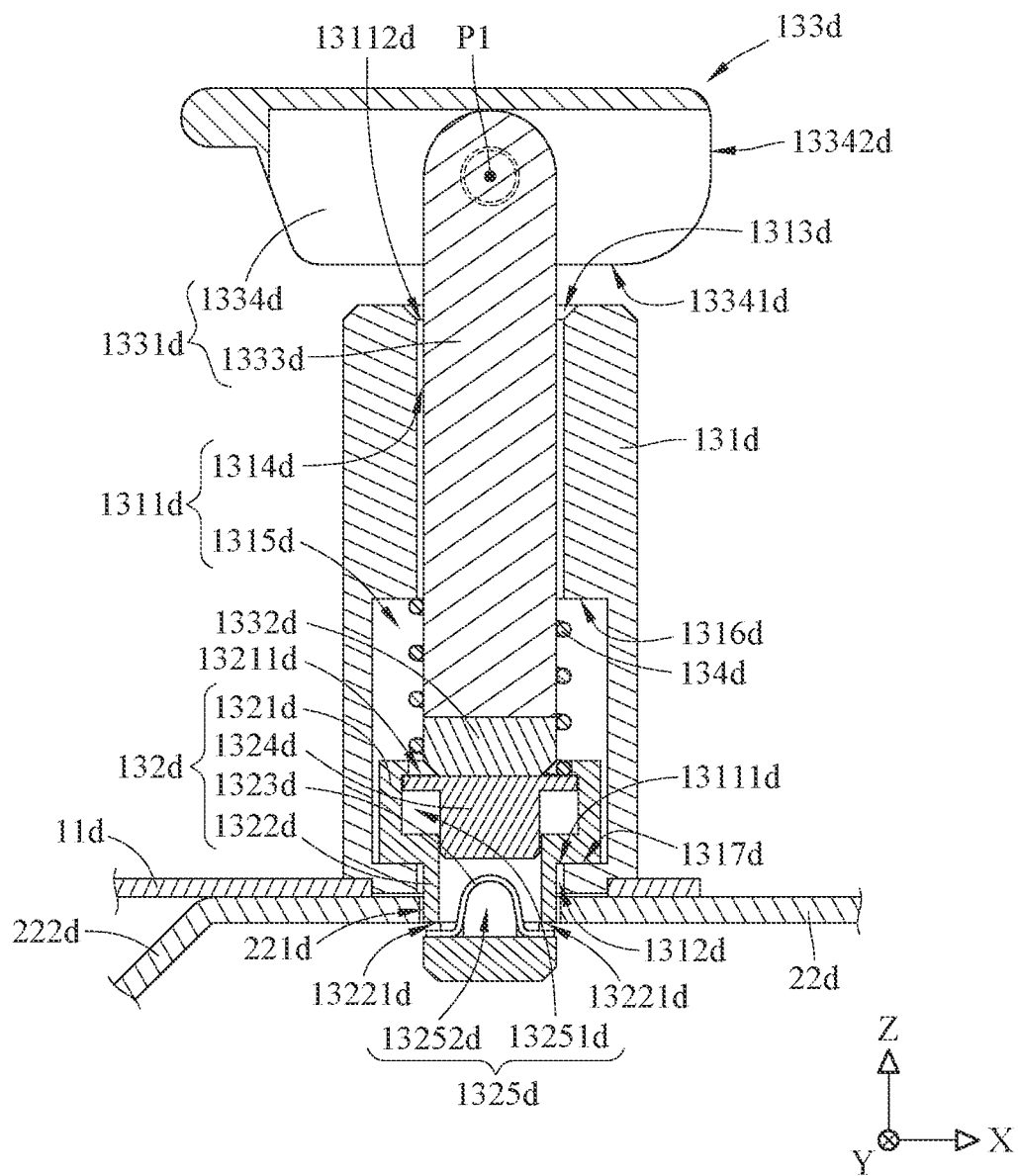
FIG. 16 is a partial cross-sectional view of the electronic assembly and the casing in FIG. 15 when a disengagement component is inserted into a fixed component.

The engagement component 132d has an interior channel 1325d, and the interior channel 1325d has a wide portion 13251d and a narrow portion 13252d communicating with each other. An inner diameter of the wide portion 13251d is larger than an inner diameter of the narrow portion 13252d, and a third contact surface 13253d is formed at a place where the wide portion 13251d communicates with the narrow portion 13252d. The wide portion 13251d of the interior channel 1325d is located at the slidable portion 1321d, and the narrow portion 13252d extends from the slidable portion 1321d to the engagement portion 1322d. The slidable portion 1321d has an opening 13211d, and the opening 13211d communicates with one side of the wide portion 13251d of the interior channel 1325d located farther away from the narrow portion 13252d along an axial direction of the slidable portion 1321d. An inner diameter of the opening 13211d is smaller than the inner diameter of the wide portion 13251d of the interior channel 1325d, and a fourth contact surface 13254d is formed at a place where the opening 13211d communicates with the wide portion 13251d of the interior channel 1325d. The engagement portion 1322d has two openings 13221d, and the two openings 13221d communicate with the narrow portion 13252d of the interior channel 1325d along a radial direction of the engagement portion 1322d. The lateral engagement portion 1323d is, for example, an elastic sheet. At least a part of the lateral engagement portion 1323d is located in the narrow portion 13252d of the interior channel 1325d, and two opposite ends of the lateral engagement portion 1323d respectively correspond to the two openings 13221d. The movable portion 1324d is, for example, a temporary magnet. The movable portion 1324d is slidably located in the interior channel 1325d so as to be movable between a locked position (as shown in FIG. 15) and an unlocked position (as shown in FIG. 16). The movable portion 1324d has a flange 13241d, and the flange 13241d is located in the wide portion 13251d of the interior channel 1325d and located between the third contact surface 13253d and the fourth contact surface 13254d.

The elastic component 134d is, for example, a compression spring. The elastic component 134d extends to the wide portion 13251*d* of the interior channel 1325*d* from the wide portion 1315*d* of the slide channel 1311*d* of the fixed component 131*d* through the opening 13211*d* of the slidable portion 1321*d*, and two opposite ends of the elastic component 134*d* are respectively in contact with the first contact surface 1316*d* and the movable portion 1324*d* of the engagement component 132*d*. The elastic component 134*d* is configured to force the movable portion 1324*d* to move from the unlocked position towards the locked position. When there is no other force applied on the movable portion 1324*d*, the elastic component 134*d* constantly forces the movable portion 1324*d* to be in the locked position, such that the movable portion 1324*d* presses against the third contact surface 13253*d* and the lateral engagement portion 1323*d* for forcing the engagement portion 1322*d* to stick out of the slide channel 1311*d* from the first opening 1312*d* of the fixed component 131*d* and to be maintained to be inserted into the positioning hole 221*d* of the positioning plate 22*d* of the casing 20*d*, and forcing two opposite ends of the lateral engagement portion 1323*d* to respectively stick out of the interior channel 1325*d* from the two openings 13221*d* and to be engaged with the positioning plate 22*d*. As a result, the tray 11*d* is not only unable to be moved horizontally along the X-axis direction and Y-axis direction, but unable to be moved vertically along the Z-axis direction; that is, the cooperation of the engagement portion 1322*d* and the lateral engagement portion 1323*d* can position the electronic assembly 10*d* in three axes (e.g., X axis, Y axis and Z axis), and thus the positioning pillar 23 shown in FIG. 2 can be omitted in the casing 20*d*, and the positioning hole 111 shown in FIG. 2 can be omitted in the tray 11*d*.

Note that the elastic component 134*d* is not restricted to being the compression spring; in some other embodiments, the elastic component may be an extension spring, two opposite ends of the extension spring may be respectively fixed to the third contact surface and the flange of the movable portion. In addition, the elastic component 134*d* is an optional component and may be omitted in some other embodiments.

The disengagement component 133*d* includes a main portion 1331*d* and a magnetic portion 1332*d*. The main portion 1331*d* includes an insertion body 1333*d* and a handle 1334*d*. The insertion body 1333*d* is, for example, a cylindrical pillar. The handle 1334*d* is pivotally disposed on one end of the insertion body 1333*d*. The handle 1334*d* has a first contact surface 13341*d* and a second contact surface 13342*d* located adjacent to each other. A distance D3 from the first contact surface 13341*d* to a rotation axis P1 of the handle 1334*d* is smaller than a distance D4 from the second contact surface 13342*d* to the rotation axis P1 of the handle 1334*d*. The magnetic portion 1332*d* is, for example, a permanent magnet, and the magnetic portion 1332*d* is disposed on another end of the insertion body 1333*d* located farther away from the handle 1334*d*. In this embodiment, a magnetically attractive force between the magnetic portion 1332*d* of the disengagement component 133*d* and the movable portion 1324*d* is greater than a force that the elastic component 134*d* applies on the movable portion 1324*d*, and the force that the elastic component 134*d* applies on the movable portion 1324*d* is greater than a resilient force of the lateral engagement portion 1323*d*.

In this embodiment, the insertion body 1333*d* is removably inserted into the slide channel 1311*d* from the second opening 1313*d* of the fixed component 131*d* for enabling the magnetic portion 1332*d* to move the movable portion 1324*d* of the engagement component 132*d* from the locked position to the unlocked position. The handle 1334*d* is located outside the fixed component 131*d*. The handle 1334*d* is pivotable relative to the insertion body 1333*d* to move the engagement portion 1322*d* of the engagement component 132*d* to retract into the wide portion 1315*d* of the slide channel 1311*d* from the first opening 1312*d* of the fixed component 131*d* for disengaging the engagement component 132*d* from the positioning hole 221*d* of the positioning plate 22*d* of the casing 20*d*.

Figure 17:
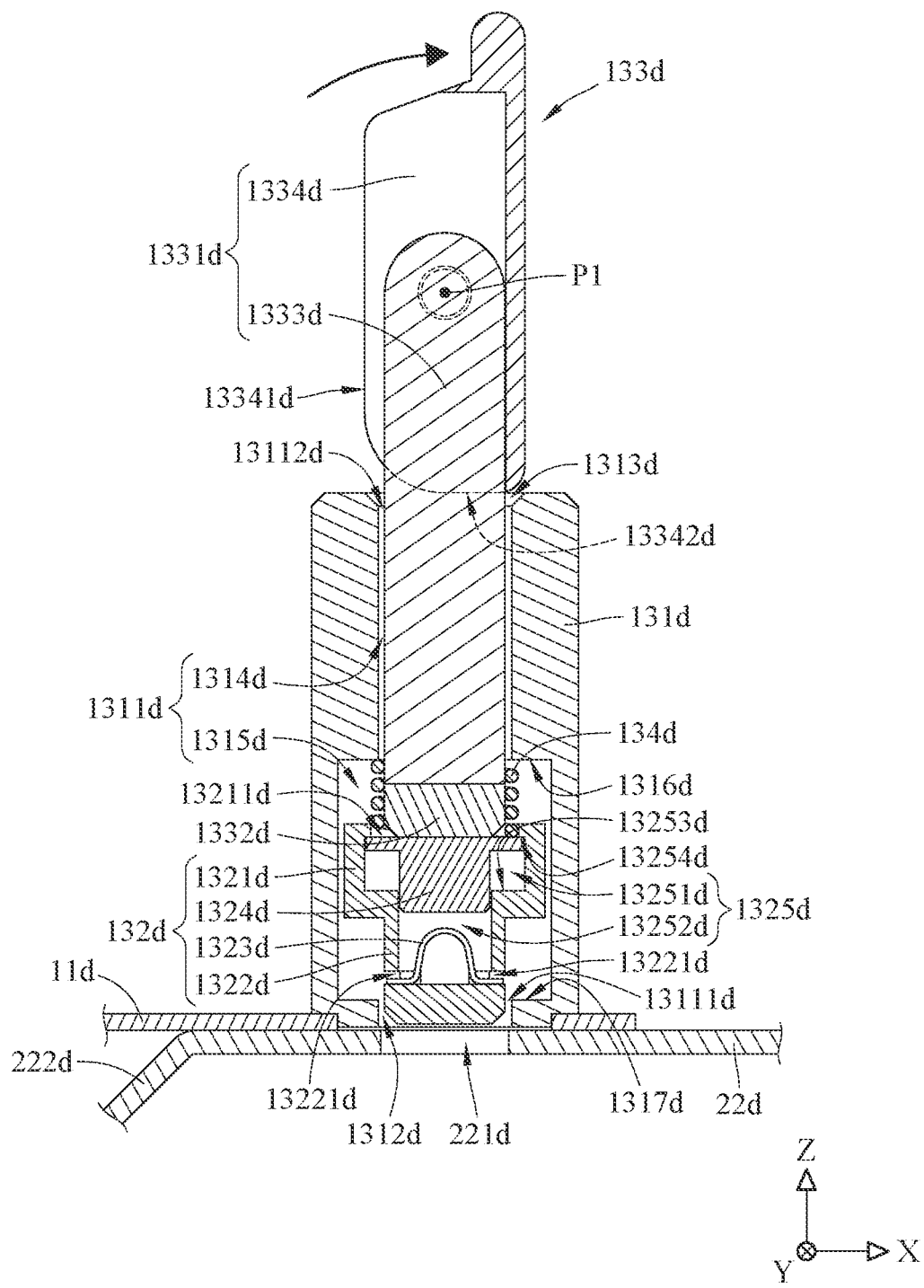
FIG. 17 is a partial cross-sectional view of the electronic assembly and the casing in FIG. 16 when the disengagement component moves an engagement component to retract into a slide channel of the fixed component.

Specifically, referring to FIGS. 16 and 17, FIG. 16 is a partial cross-sectional view of the electronic assembly 10*d* and the casing 20*d* in FIG. 15 when the disengagement component 133*d* is inserted into the fixed component 131*d*, and FIG. 17 is a partial cross-sectional view of the electronic assembly 10*d* and the casing 20*d* in FIG. 16 when the disengagement component 133*d* moves the engagement component 132*d* to retract into the slide channel 1311*d* of the fixed component 131*d*.

As shown in FIG. 16, in a case that the tray 11*d* is fixed to the casing 20*d*, when the tray 11*d* is required to be removed from the casing 20*d*, a user can insert the insertion body 1333*d* of the main portion 1331*d* of the disengagement component 133*d* into the slide channel 1311*d* from the second opening 1313*d* of the fixed component 131*d*, such that the first contact surface 13341*d* of the handle 1334*d* faces one end of the fixed component 131*d* located farther away from the tray 11*d*, and the magnetic portion 1332*d* of the disengagement component 133*d* attracts the movable portion 1324*d* of the engagement component 132*d* so as to move the movable portion 1324*d* from the locked position to the unlocked position. At this moment, the movable portion 1324*d* does not press against the lateral engagement portion 1323*d* so as to allow to the lateral engagement portion 1323*d* to rebound. Therefore, two opposite ends of the lateral engagement portion 1323*d* respectively retract into the interior channel 1325*d* from the two openings 13221*d* so as to disengage the lateral engagement portion 1323*d* from the positioning plate 22*d*.

Then, as shown in FIG. 17, the user can rotate the handle 1334*d* to allow the second contact surface 13342*d* of the handle 1334*d* to contact the end of the fixed component 131*d* located farther away from the tray 11*d* so as to move the insertion body 1333*d* upwards. During the upward movement of the insertion body 1333*d*, the magnetic portion 1332*d* of the disengagement component 133*d* attracts the movable portion 1324*d* of the engagement component 132*d* to move upward to be located closer to the another side 13112*d* of the slide channel 1311*d*, such that the engagement portion 1322*d* of the engagement component 132*d* is removed from the positioning hole 221*d* of the positioning plate 22*d* of the casing 20*d*. As a result, the engagement portion 1322*d* of the engagement component 132*d* is disengaged from the positioning hole 221*d* of the positioning plate 22*d* of the casing 20*d*, and thus the tray 11*d* can be removed from the casing 20*d*. In this embodiment as shown in figures, the engagement portion 1322*d* of the engagement component 132*d* retracts into the wide portion 1315*d* of the slide channel 1311*d* from the first opening 1312*d* of the fixed component 131*d*, thereby preventing the engagement portion 1322*d* from interfering with the casing 20*d* when the tray 11*d* is horizontally moved relative to the casing 20*d*.

In this embodiment, the slidable portion 1321*d* of the engagement component 132*d* is slidably hidden in the slide channel 1311*d* of the fixed component 131*d*, and the disengagement component 133*d* is removably inserted into the slide channel 1311*d* of the fixed component 131*d*, such that not everyone can move the engagement component 132*d* for disengaging the engagement component 132*d* from the positioning hole 221*d* of the positioning plate 22*d* of the casing 20*d*. In other words, when the electronic assembly 10*d* is required to be removed from the casing 20*d*, only specific people having the disengagement component 133*d* can insert the disengagement component 133*d* into the slide channel 1311*d* of the fixed component 131*d* to disengage the engagement component 132*d* from the positioning hole 221*d* of the positioning plate 22*d* of the casing 20*d*. As a result, the electronic assembly 10*d* is prevented from being accidently removed from the casing 20*d* by other people, and the electronic assembly 10*d* is prevented from being stolen by irrelevant people.

When the tray 11*d* is required to be fixed to the casing 20*d*, the disengagement component 133*d* can be firstly inserted into the slide channel 1311*d* of the fixed component 131*d* for using the magnetic portion 1332*d* to attract the movable portion 1324*d* of the engagement component 132*d*, such that the engagement portion 1322*d* of the engagement component 132*d* is retracted into the slide channel 1311*d* of the fixed component 131*d*. In some scenarios, the handle 1334*d* may be maintained in the state shown in FIG. 17 for maintaining the engagement portion 1322*d* to be in a position where the engagement portion 1322*d* is retracted into the slide channel 1311*d* of the fixed component 131*d*. Then, after the engagement portion 1322*d* of the engagement component 132*d* is aligned with the positioning hole 221*d* of the positioning plate 22*d* of the casing 20*d*, the disengagement component 133*d* is removed from the fixed component 131*d*, such that the elastic component 134*d* moves the engagement portion 1322*d* of the engagement component 132*d* to stick out of the slide channel 1311*d* of the fixed component 131*d* and insert into the positioning hole 221*d* of the positioning plate 22*d* of the casing 20*d*, allows the movable portion 1324*d* to press against the lateral engagement portion 1323*d*, and forces the two opposite ends of the lateral engagement portion 1323*d* to stick out of the openings 13221*d* to be engaged with the positioning plate 22*d*.

Alternatively, during the installation of the tray 11*d* on the casing 20*d*, the disengagement component 133*d* may not be used. For example, the positioning plate 22*d* of the casing 20*d* has an inclined plate portion 222*d*. By sliding the tray 11*d*, the engagement portion 1322*d* of the engagement component 132*d* can press against the inclined plate portion 222*d* of the positioning plate 22*d* so as to be moved upwards and compress the elastic component 134*d*. After the engagement portion 1322*d* of the engagement component 132*d* is aligned with the positioning hole 221*d* of the positioning plate 22*d*, the elastic component 134*d* automatically forces the engagement portion 1322*d* of the engagement component 132*d* to move downwards, such that the lateral engagement portion 1323*d* presses against the positioning plate 22*d* so as to be deformed and pass through the positioning hole 221*d* of the positioning plate 22*d*, and the engagement portion 1322*d* is inserted into the positioning hole 221*d* of the positioning plate 22*d* of the casing 20*d*, thereby engaging the engagement component 132*d* with the positioning plate 22*d*.

Note that the structure of the disengagement component 133*d* is not restricted in the disclosure; in some other embodiments, the disengagement component may not have the handle, and the user can directly pull the insertion body to disengage the engagement component from the positioning plate of the casing.

In addition, the slidable portion 1321*d* of the engagement component 132*d* is not restricted to being hidden in the slide channel 1311*d* of the fixed component 131*d*; in some other embodiments, the slidable portion of the engagement component may be merely located in the slide channel of the fixed component, but not hidden in the slide channel of the fixed component.

In this embodiment, the movable portion 1324*d* of the engagement component 132*d* is a temporary magnet, so that the movable portion 1324*d* does not exhibit magnetism when not being magnetized, and thus the movable portion 1324*d* does not adversely affect the operation of the electronic device 12*d*. When there are other means used to prevent the electronic device 12*d* from being affected by magnetism, the movable portion of the engagement component and the magnetic component of the disengagement component may be a permanent magnet and a temporary magnet, or both of them may be permanent magnets in some other embodiments.

In this embodiment, the disengagement component 133*d* is removably connected to the movable portion 1324*d* of the engagement component 132*d* via magnetic attraction so as to move the movable portion 1324*d* of the engagement component 132*d*, but the disclosure is not limited thereto; in some other embodiments, the disengagement component may be removably connected to the movable portion of the engagement component via engagement means so as to move the movable portion of the engagement component.

On the other hand, the quantity of the openings 13221*d* of the engagement portion 1322*d* is not restricted and may be modified to be only one in some other embodiments.

Note that the engagement components of the previous embodiments can be replaced with the engagement component 132*d* of this embodiment.

Figure 18:
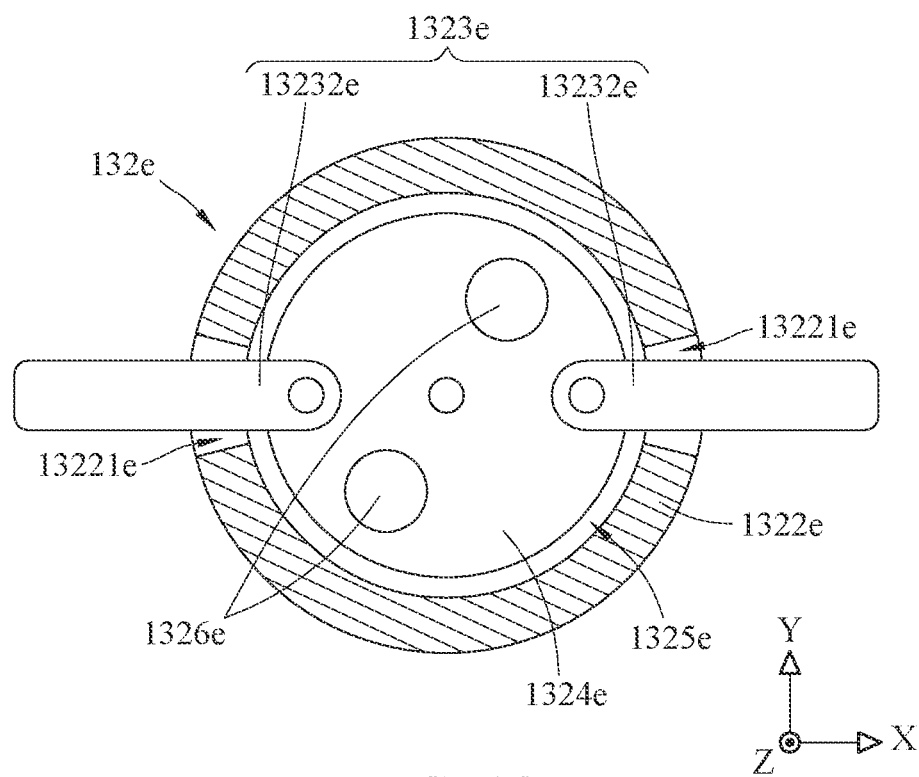
FIG. 18 is a cross-sectional view of an engagement component according to a sixth embodiment of the disclosure.
Figure 19:
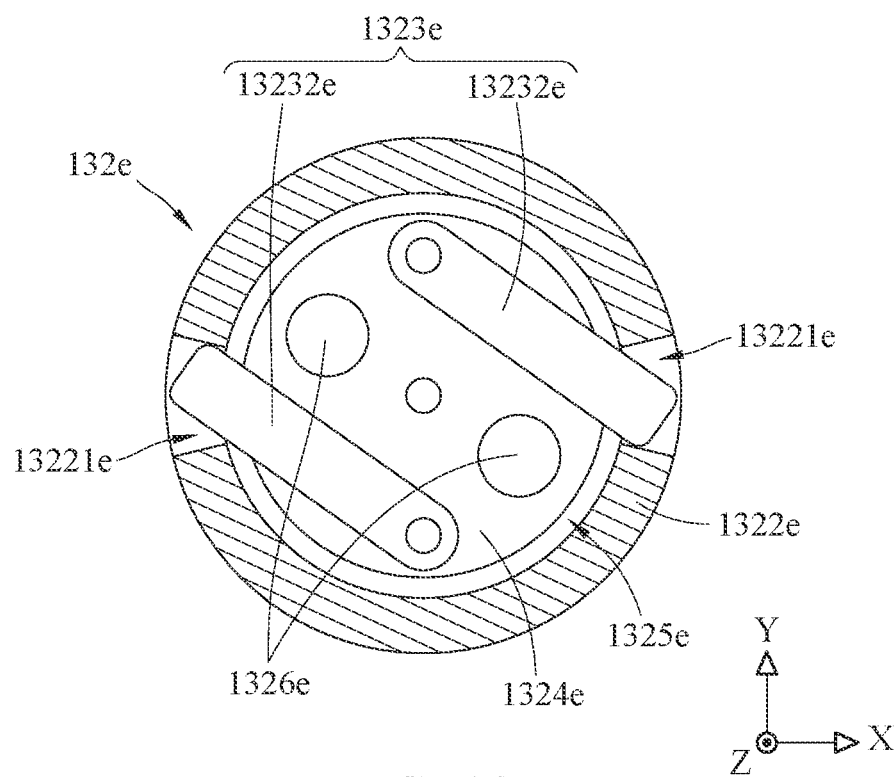
FIG. 19 is a cross-sectional view of the engagement component in FIG. 18 when lateral engagement portions are retracted into an engagement portion from two openings thereof.

Then, referring to FIGS. 18 and 19, FIG. 18 is a cross-sectional view of an engagement component 132*e* according to a sixth embodiment of the disclosure, and FIG. 19 is a cross-sectional view of the engagement component 132*e* in FIG. 18 when lateral engagement portions 1323*e* are retracted into an engagement portion 1322*e* from two openings 13221*e* thereof.

The engagement component 132*e* of this embodiment is similar to the engagement component 132*d* with reference to FIGS. 14 to 17, and the main difference between them is structures of the movable portion and the lateral engagement portion, and thus the following paragraphs mainly introduce the lateral engagement portion 1323*e* and a movable portion 1324*e* of the engagement component 132*e* of this embodiment. As for other structures of the engagement component 132*e* of this embodiment can be referred to the engagement component 132*d* with reference to FIGS. 14 to 17 and will not be further introduced hereinafter.

In this embodiment, the movable portion 1324*e* of the engagement component 132*e* is a rotatable plate, and the movable portion 1324*e* is rotatably located in an interior channel 1325*e* of the engagement component 132*e*. In addition, the lateral engagement portion 1323*e* of the engagement component 132*e* is not an elastic sheet. The lateral engagement portion 1323*e* of the engagement component 132*e* includes two retractable posts 13232*e*. The retractable posts 13232*e* are pivotally disposed on two opposite sides of the movable portion 1324*e* and respectively correspond to the two openings 13221*e* of the engagement portion 1322*e* of the engagement component 132*e*. Furthermore, the engagement component 132*e* may further include two magnetic portions 1326*e*. The two magnetic portions 1326*e* are, for example, temporary magnets, and the two magnetic portions 1326*e* are disposed on the movable portion 1324*e*.

As a result, the magnetic portion 1332*d* of the disengagement component 133*d* shown in FIG. 14 can attract the magnetic portions 1326e on the movable portion 1324e of the engagement component 132e. Then, during the rotation of the disengagement component 133d, the magnetic portion 1332d can rotate the movable portion 1324e via the magnetic portions 1326e so as to move the retractable posts 13232e to stick out of or retract into the interior channel 1325e of the engagement component 132e from the two openings 13221e of the engagement portion 1322e of the engagement component 132e.

In this embodiment, since the magnetic portion 1332d of the disengagement component 133d attracts the magnetic portions 1326e on the movable portion 1324e, it can prevent the movable portion 1324e from sliding during the rotation of the movable portion 1324e by the disengagement component 133d. Note that when there is no aforementioned issue, the engagement component may not have the magnetic portion, and the movable portion may be modified to a temporary magnet in some other embodiments.

In this embodiment, the disengagement component 133d is removably connected to the movable portion 1324e of the engagement component 132e via magnetic portions 1326e by magnetic attraction means so as to move the movable portion 1324e of the engagement component 132e, but the disclosure is not limited thereto; in some other embodiments, the disengagement component may be removably connected to the movable portion of the engagement component via an engagement means so as to move the movable portion of the engagement component. In other words, the engagement component and the disengagement component both may not have any magnetic portion, while the engagement component and the disengagement component may have engagement structures (e.g., a recess and a protrusion) matching each other. As a result, the disengagement component can rotate the movable portion of the engagement component via the engagement structures.

Note that the engagement components of the previous embodiments can be replaced with the engagement component 132e of this embodiment.

Figure 20:
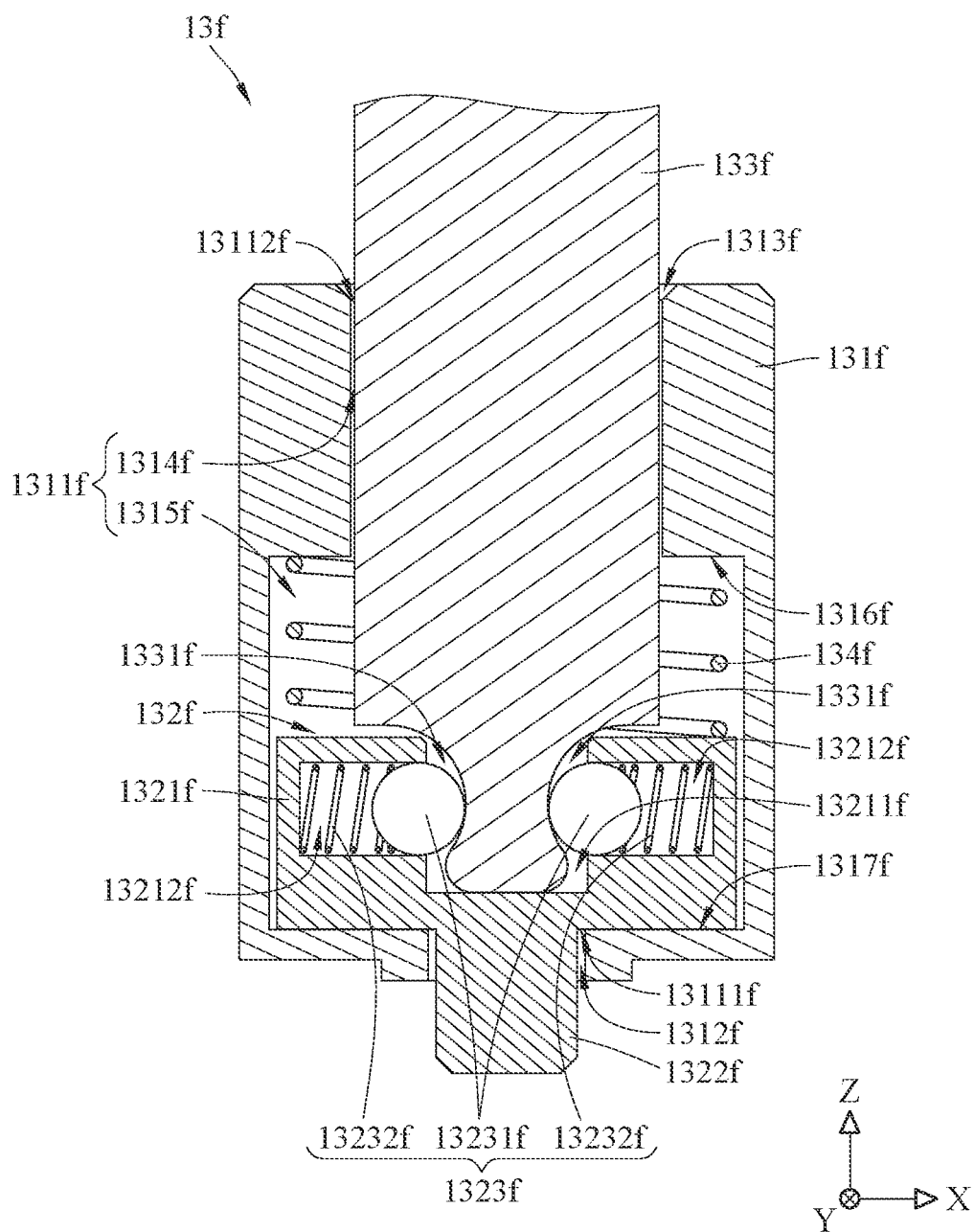
FIG. 20 is a cross-sectional view of a quick release mechanism according to a seventh embodiment of the disclosure.
Figure 21:
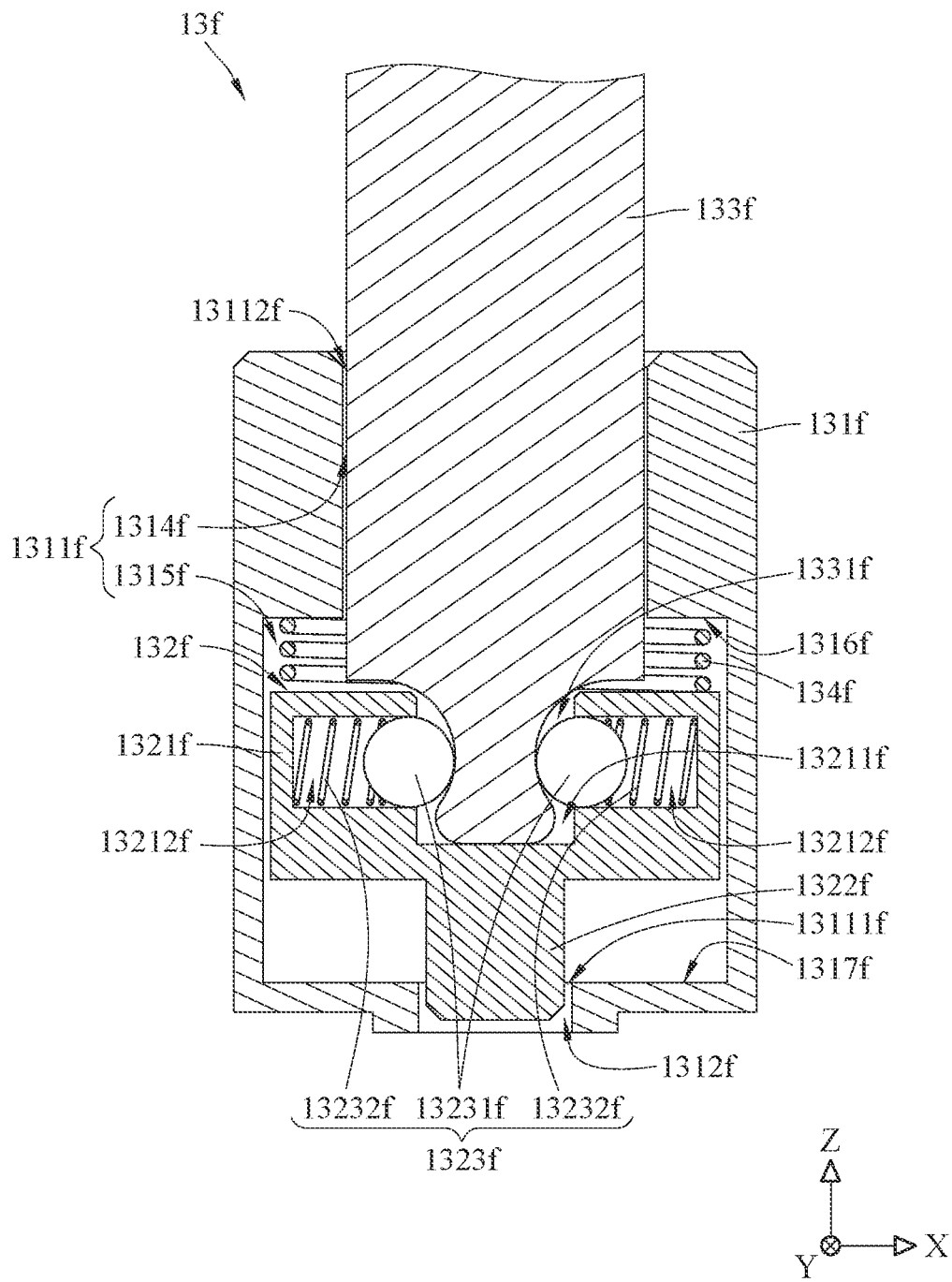
FIG. 21 is a partial cross-sectional view of the quick release mechanism in FIG. 20 when a disengagement component moves an engagement component into a slide channel of a fixed component.

In the previous embodiments, each disengagement component moves the engagement component to retract into the slide channel from the first opening of the fixed component via magnetic attraction, but the disclosure is not limited thereto; in some other embodiments, the disengagement component may move the engagement component to retract into the slide channel from the first opening of the fixed component via a non-magnetic attraction means. For example, referring to FIGS. 20 and 21, FIG. 20 is a cross-sectional view of a quick release mechanism 13f according to a seventh embodiment of the disclosure, and FIG. 21 is a partial cross-sectional view of the quick release mechanism 13f in FIG. 20 when a disengagement component 133f moves an engagement component 132f into a slide channel 1311f of a fixed component 131f.

The quick release mechanism 13f includes a fixed component 131f, an engagement component 132f and a disengagement component 133f. In addition, the quick release mechanism 13f may further include an elastic component 134f.

The fixed component 131f has a slide channel 1311f, a first opening 1312f and a second opening 1313f. The slide channel 1311f has a narrow portion 1314f and a wide portion 1315f communicating with each other. An inner diameter of the wide portion 1315f is larger than an inner diameter of the narrow portion 1314f, and a first contact surface 1316f is formed at a place where the wide portion 1315f communicates with the narrow portion 1314f. The first opening 1312f communicates with one side of the wide portion 1315f located farther away from the narrow portion 1314f; that is, the first opening 1312f communicates with one side 13111f of the slide channel 1311f. An inner diameter of the first opening 1312f is smaller than the inner diameter of the wide portion 1315f, and a second contact surface 1317f is formed at a place where the first opening 1312f communicates with the wide portion 1315f. The second opening 1313f is, for example, a round opening, and the second opening 1313f communicates with one side of the narrow portion 1314f of the slide channel 1311f located farther away from the wide portion 1315f; that is, the second opening 1313f communicates with another side 13112f of the slide channel 1311f.

The engagement component 132f includes a slidable portion 1321f, an engagement portion 1322f and a fastening portion 1323f. The engagement portion 1322f is connected to the slidable portion 1321f, and an outer diameter of the engagement portion 1322f is smaller than an outer diameter of the slidable portion 1321f. The slidable portion 1321f is slidably hidden in the wide portion 1315f of the slide channel 1311f of the fixed component 131f. The engagement portion 1322f sticks out of the slide channel 1311f of the fixed component 131f from the first opening 1312f of the fixed component 131f.

In this embodiment, the slidable portion 1321f has an insertion slot 13211f and two accommodation recesses 13212f. The insertion slot 13211f is located between the two accommodation recesses 13212f. The fastening portion 1323f includes two beads 13231f and two springs 13232f. The two beads 13231f are respectively located at two places where the insertion slot 13211f communicates with the two accommodation recesses 13212f. The springs 13232f are respectively located in the two accommodation recesses 13212f, and the springs 13232f are respectively located farther away from the insertion slot 13211f than the two beads 13231f. The two springs 13232f are respectively configured to force the beads 13231f to move towards the insertion slot 13211f.

In this embodiment, the elastic component 134f is, for example, a compression spring. The elastic component 134f is located in the wide portion 1315f of the slide channel 1311f of the fixed component 131f, and two opposite ends of the elastic component 134f are respectively in contact with the first contact surface 1316f and the slidable portion 1321f of the engagement component 132f. The elastic component 134f is configured to move the slidable portion 1321f so as to move the engagement portion 1322f to stick out of the slide channel 1311f from the first opening 1312f of the fixed component 131f; that is, when there is no other force applied on the engagement portion 1322f, the elastic component 134f constantly forces the engagement portion 1322f to stick out of the slide channel 1311f from the first opening 1312f of the fixed component 131f.

Note that the elastic component 134f is not restricted to being the compression spring. In some other embodiments, the elastic component may be an extension spring, and two opposite ends of the extension spring are respectively fixed to the second contact surface and the slidable portion of the engagement component. In addition, the elastic component 134f may be an optional component. In some other embodiments, the quick release mechanism may not have the elastic component, and the engagement portion may be maintained to stick out of the slide channel from the first opening of the fixed component and to be inserted into the positioning hole of the positioning plate of the casing via gravity.

The disengagement component 133f has two grooves 1331f. The disengagement component 133f is removably inserted into the slide channel 1311f of the fixed component 131*f* from the second opening 1313*f* of the fixed component 131*f*, and the two grooves 1331*f* of the disengagement component 133*f* are removably engaged with the two beads 13231*f* of the engagement component 132*f*. As a result, the disengagement component 133*f* can move the entire engagement component 132*f* upwards so as to move the engagement portion 1322*f* of the engagement component 132*f* to be located closer to the another side 13112 of the slide channel 1311*f* and then retract into the slide channel 1311*f* from the first opening 1312*f* of the fixed component 131*f*.

Note that the quick release mechanisms of the previous embodiments can be replaced with the quick release mechanism 13*f* of this embodiment.

In the embodiment of the quick release mechanism 13*d* with reference to FIGS. 14 to 17, the disengagement component 133*d* is removable from the movable portion 1324*d* of the engagement component 132*d*, but the disclosure is not limited thereto; in some other embodiments, the disengagement component may be irremovable from the movable portion of the engagement component. For example, referring to FIG. 22, FIG. 22 is a cross-sectional view of a quick release mechanism 13*g* according to an eighth embodiment of the disclosure.

The quick release mechanism 13*g* of this embodiment is similar to the quick release mechanism 13*d* with reference to FIGS. 14 to 17, the main difference between them is the connection relationship between the disengagement component and the movable portion of the engagement component, and thus the following paragraphs mainly introduce a connection relationship between a disengagement component 133*g* and a movable portion 1324*g* of an engagement component 132*g* of this embodiment. As for other structures of the quick release mechanism 13*g* of this embodiment can be referred to the quick release mechanism 13*d* with reference to FIGS. 14 to 17 and will not be repeatedly introduced hereinafter.

In this embodiment, the disengagement component 133*g* is irremovably fixed to the movable portion 1324*g* of the engagement component 132*g*. For example, the disengagement component 133*g* and the movable portion 1324*g* of the engagement component 132*g* are integrally formed as one piece, but the disclosure is not limited thereto; in some other embodiments, the disengagement component may be irremovably fixed to the movable portion of the engagement component via an adhesion or engagement means.

Figure 22:
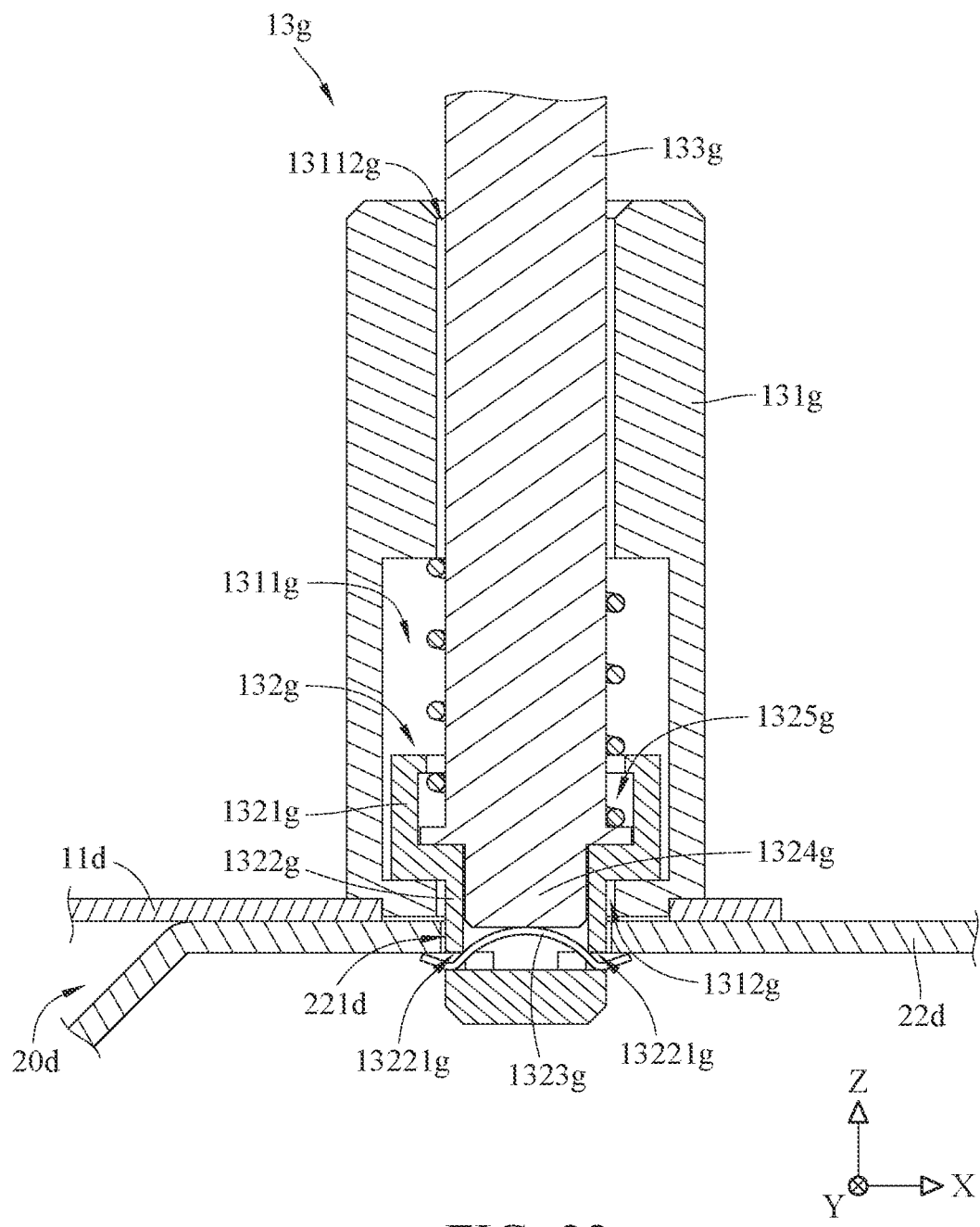
FIG. 22 is a cross-sectional view of a quick release mechanism according to an eighth embodiment of the disclosure.
Figure 23:
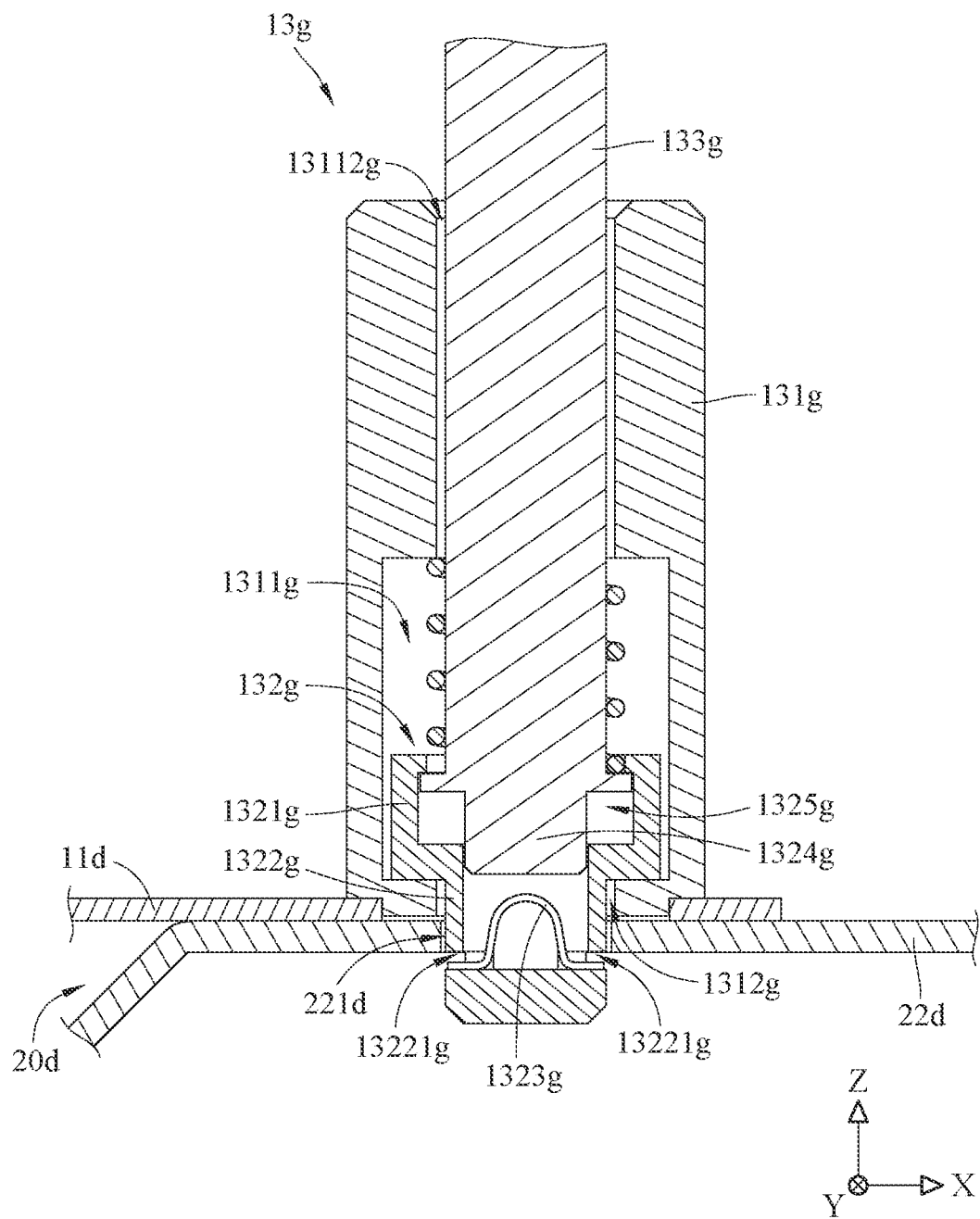
FIG. 23 is a cross-sectional view of the quick release mechanism in FIG. 22 when a disengagement component moves a movable portion of an engagement component.
Figure 24:
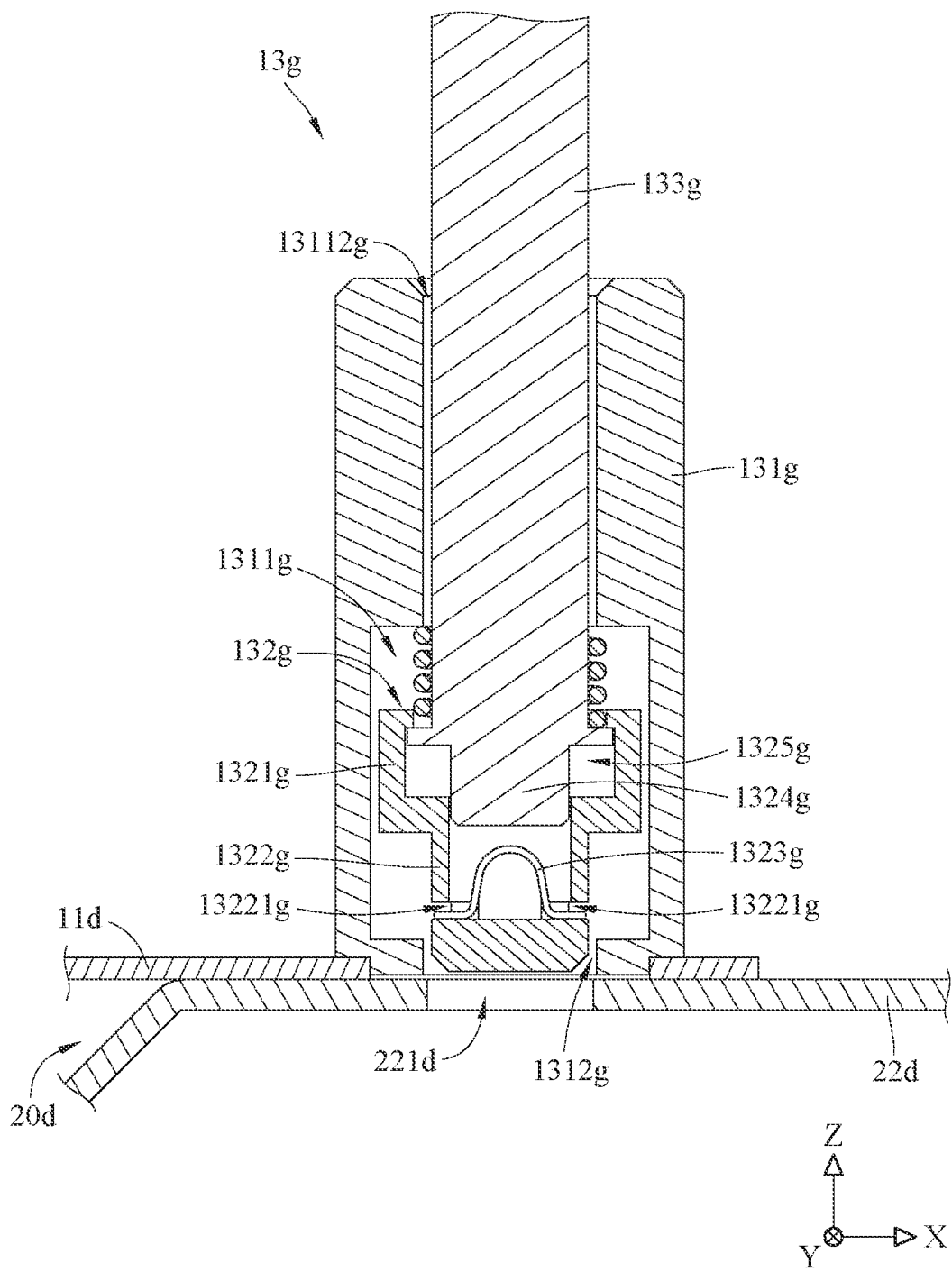
FIG. 24 is a partial cross-sectional view of the quick release mechanism in FIG. 22 when the disengagement component moves an engagement portion of the engagement component.

Then, referring to FIGS. 23 and 24, FIG. 23 is a cross-sectional view of the quick release mechanism 13*g* in FIG. 22 when the disengagement component 133*g* moves the movable portion 1324*g* of the engagement component 132*g*, and FIG. 24 is a partial cross-sectional view of the quick release mechanism 13*g* in FIG. 22 when the disengagement component 133*g* moves an engagement portion 1322*g* of the engagement component 132*g*.

As shown in FIG. 23, when the engagement component 132*g* is required to be disengaged from the casing 20*d*, a user can pull the disengagement component 133*g* upwards, such that the disengagement component 133*g* moves the movable portion 1324*g* of the engagement component 132*g* in an interior channel 1325*g* from a locked position to an unlocked position. At this moment, the movable portion 1324*g* does not press against a lateral engagement portion 1323*g* so as to allow to the lateral engagement portion 1323*g* to rebound. Therefore, two opposite ends of the lateral engagement portion 1323*g* respectively retract into the interior channel 1325*d* from two openings 13221*g* of the engagement portion 1322*g* of the engagement component 132*g* so as to disengage the lateral engagement portion 1323*g* from the positioning plate 22*d* of the casing 20*d*.

Then, as shown in FIG. 24, the disengagement component 133*g* is further pulled upwards, such that the movable portion 1324*g* of the engagement component 132*g* moves the slidable portion 1321*g* upwards to be located closer to another side 13112*g* of a slide channel 1311*g*, such that the engagement portion 1322*g* of the engagement component 132*g* is removed from the positioning hole 221*d* of the positioning plate 22*d* of the casing 20*d*, and then is retracted into the slide channel 1311*g* from a first opening 1312*g* of a fixed component 131*g*. As a result, the engagement portion 1322*g* of the engagement component 132*g* is disengaged from the positioning plate 22*d*, and thus the tray 11*d* can be removed from the casing 20*d*.

In this embodiment, the cooperation of the engagement portion 1322*g* and the lateral engagement portion 1323*g* can position the electronic assembly in three axes (e.g., X axis, Y axis and Z axis), and thus the positioning pillar 23 shown in FIG. 2 can be omitted in the casing 20*d*, and the positioning hole 111 shown in FIG. 2 can be omitted in the tray 11*d*.

According to the quick release mechanisms and the electronic assemblies, the slidable portion of the engagement component is slidably hidden in the slide channel of the fixed component, and the disengagement component is removably disposed on the fixed component, such that not everyone can move the engagement component for disengaging the engagement portion of the engagement component. In other words, when the electronic assembly is required to be removed from the casing, only specific people having the disengagement component can install the disengagement component on the fixed component to disengage the engagement portion of the engagement component. As a result, the electronic assembly is prevented from being accidently removed by other people, and the electronic assembly is prevented from being stolen by irrelevant people.

In addition, the engagement portion of the engagement component can pass through the first opening of the fixed component, the openings of the engagement portion communicate with the interior channel of the engagement component along the radial direction of the engagement portion, and the movable portion is movably located in the interior channel so as to force the lateral engagement portion to stick out of or retract into the interior channel, such that when the engagement portion and the lateral engagement portion of the engagement component are engaged with the casing, the engagement portion limits the movement of the tray along a horizontal direction, and the lateral engagement portion limits the movement of the tray along a vertical direction for firmly fixing the tray to the casing.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A quick release mechanism, comprising:
   a fixed component, having at least one slide channel and at least one first opening, wherein the at least one first opening communicates with one side of the at least one slide channel;
   at least one engagement component, comprising a slidable portion and an engagement portion, wherein the slidable portion is slidably located in the at least one slide channel, and the engagement portion is connected to the slidable portion and configured to penetrate through the at least one first opening; and a disengagement component, removably disposed on the fixed component so as to move the engagement portion of the at least one engagement component to be located closer to or farther away from another side of the at least one slide channel;

wherein the quick release mechanism further comprises at least one elastic component, the at least one elastic component is disposed in the at least one slide channel, two opposite ends of the at least one elastic component are respectively connected to the fixed component and the slidable portion of the at least one engagement component, the at least one elastic component is configured to move the engagement portion of the at least one engagement component to stick out of the at least one slide channel from the at least one first opening.

2. The quick release mechanism according to claim 1, wherein the disengagement component moves the engagement portion of the at least one engagement component to retract into the at least one slide channel from the at least one first opening via magnetic attraction.

3. The quick release mechanism according to claim 2, wherein the at least one engagement component further comprises a first magnetic portion, the first magnetic portion is disposed on the slidable portion, the disengagement component comprises a main portion and a second magnetic portion, the second magnetic portion is disposed on the main portion, and the second magnetic portion is attracted to the first magnetic portion.

4. The quick release mechanism according to claim 3, wherein the first magnetic portion is a temporary magnet, and the second magnetic portion is a permanent magnet.

5. The quick release mechanism according to claim 3, wherein the fixed component further has a second opening, the second opening communicates with the another side of the at least one slide channel, the main portion comprises an insertion body, the second magnetic portion is disposed on the insertion body, the insertion body is removably inserted into the at least one slide channel from the second opening and is removably connected to the slidable portion via the first magnetic portion and the second magnetic portion.

6. The quick release mechanism according to claim 5, wherein the second opening is a round opening, and the insertion body is a cylindrical pillar or a non-cylindrical pillar.

7. The quick release mechanism according to claim 5, wherein the second opening is a non-round opening, and the insertion body is a non-cylindrical pillar fitting the second opening.

8. The quick release mechanism according to claim 3, wherein the at least one slide channel comprises a plurality of slide channels, the at least one first opening comprises a plurality of first openings, the plurality of first openings respectively communicate with the plurality of slide channels, the plurality of slide channels are arranged along a straight line, the at least one engagement component comprises a plurality of engagement components, the slidable portions of the plurality of engagement components are respectively and slidably located in the plurality of slide channels, the engagement portions of the plurality of engagement components respectively correspond to the plurality of first openings, the main portion is removably and slidably disposed on the fixed component for allowing the second magnetic portion to correspond to one of the plurality of slide channels.

9. The quick release mechanism according to claim 3, wherein the at least one slide channel comprises a plurality of slide channels, the at least one first opening comprises a plurality of first openings, the plurality of first openings respectively communicate with the plurality of slide channels, the plurality of slide channels are arranged along a circle, the at least one engagement component comprises a plurality of engagement components, the slidable portions of the plurality of engagement components are respectively and slidably located in the plurality of slide channels, the engagement portions of the plurality of engagement components respectively correspond to the plurality of first openings, the main portion is removably and rotatably disposed on the fixed component for allowing the second magnetic portion to correspond to one of the plurality of slide channels.

10. The quick release mechanism according to claim 1, wherein the disengagement component moves the engagement portion of the at least one engagement component to retract into the at least one slide channel from the at least one first opening via a snap-fit manner.

11. The quick release mechanism according to claim 1, wherein the at least one engagement component has an interior channel, the interior channel extends from the slidable portion to the engagement portion, the engagement portion has at least one opening, the at least one opening communicates with the interior channel along a radial direction of the engagement portion, the at least one engagement component further comprises a lateral engagement portion and a movable portion, at least a part of the lateral engagement portion is located in the interior channel and sticks out of or retracts into the interior channel from the at least one opening, the movable portion is movably located in the interior channel, the fixed component further has at least one second opening, the at least one second opening communicates with the another side of the at least one slide channel, the disengagement component is removably disposed through the at least one second opening and is removably connected to the movable portion so as to move the movable portion for retracting the lateral engagement portion into the interior channel from the at least one opening.

12. The quick release mechanism according to claim 11, wherein the lateral engagement portion is an elastic sheet, the movable portion is moved from a locked position to a unlocked position by the disengagement component; when the movable portion is in the locked position, the movable portion presses against the lateral engagement portion so as to force a part of the lateral engagement portion to stick out of the interior channel from the at least one opening; when the movable portion is in the unlocked position, the movable portion does not press against the lateral engagement portion so as to allow the lateral engagement portion to retract into the interior channel from the at least one opening.

13. The quick release mechanism according to claim 12, wherein the at least one elastic component is disposed on the movable portion, and the at least one elastic component is configured to move the movable portion from the unlocked position towards the locked position.

14. The quick release mechanism according to claim 13, wherein the disengagement component moves the movable portion via magnetic attraction, a magnetically attractive force between the disengagement component and the movable portion is greater than a force that the at least one elastic component applies on the movable portion, and the force that the at least one elastic component applies on the movable portion is greater than a resilient force of the lateral engagement portion.

15. The quick release mechanism according to claim 1, wherein the slidable portion is slidably hidden in the at least one slide channel.

16. An electronic assembly, adapted to be disposed on a casing, comprising:
- a tray, adapted to be disposed on the casing;
- an electronic device, fixed to the tray; and
- a quick release mechanism, comprising:
  - a fixed component, fixed to the tray and having at least one slide channel and at least one first opening, wherein the at least one first opening communicates with one side of the at least one slide channel; and
  - at least one engagement component, comprising a slidable portion and an engagement portion, wherein the slidable portion is slidably located in the at least one slide channel, and the engagement portion is connected to the slidable portion and is configured to be inserted into or removed from a positioning hole of the casing;
- wherein the quick release mechanism further comprises at least one elastic component, the at least one elastic component is disposed in the at least one slide channel, two opposite ends of the at least one elastic component are respectively connected to the fixed component and the slidable portion of the at least one engagement component, the at least one elastic component is configured to move the engagement portion of the at least one engagement component to stick out of the at least one slide channel from the at least one first opening.

17. The electronic assembly according to claim 16, wherein the quick release mechanism further comprises a disengagement component, the disengagement component is removably disposed on the fixed component so as to move the engagement portion of the at least one engagement component to retract into the at least one slide channel via the at least one first opening.

18. The electronic assembly according to claim 17, wherein the disengagement component moves the engagement portion of the at least one engagement component to retract into the at least one slide channel from the at least one first opening via magnet attraction.

19. A quick release mechanism, comprising:
- a fixed component, having at least one slide channel and at least one first opening, wherein the at least one first opening communicates with one side of the at least one slide channel; and
- at least one engagement component, comprising a slidable portion, an engagement portion, a lateral engagement portion and a movable portion, wherein the slidable portion is slidably located in the at least one slide channel, the engagement portion is connected to the slidable portion and configured to be penetrate through the at least one first opening, the at least one engagement component has an interior channel, the interior channel extends from the slidable portion to the engagement portion, the engagement portion has at least one opening, the at least one opening communicates with the interior channel along a radial direction of the engagement portion, at least a part of the lateral engagement portion is located in the interior channel and corresponds to the at least one opening, the movable portion is movably located in the interior channel so as to move the lateral engagement portion to stick out of or retract into the interior channel from the at least one opening;
- wherein the quick release mechanism further comprises at least one elastic component, the at least one elastic component is disposed in the at least one slide channel, two opposite ends of the at least one elastic component are respectively connected to the fixed component and the slidable portion of the at least one engagement component, the at least one elastic component is configured to move the engagement portion of the at least one engagement component to stick out of the at least one slide channel from the at least one first opening.

20. The quick release mechanism according to claim 19, further comprising a disengagement component, wherein the fixed component further has at least one second opening, the at least one second opening communicates with another side of the at least one slide channel, the disengagement component is movably disposed through the at least one second opening and inserted into the at least one slide channel, the disengagement component is fixed to the movable portion so as to move the movable portion for retracting the lateral engagement portion into the interior channel from the at least one opening and moving the engagement portion of the at least one engagement component to be located closer to or farther away from the another side of the at least one slide channel.

* * * * *